United States Patent [19]

Mochinaga et al.

[11] Patent Number: 5,526,351
[45] Date of Patent: Jun. 11, 1996

[54] NETWORK BROADCAST COMMUNICATION SYSTEM AND COMMUNICATION NETWORK CONNECTING APPARATUS

[76] Inventors: Tatsuo Mochinaga, Sun Heights Horiuchi 103, 1273 Kamikurata-cho, Totsuka-ku, Yokohama-shi, Kanagawa-ken; Eichi Amada, 4-36-11-304 Funabashi, Setagaya-ku, Tokyo; Yoshihiro Takiyasu, 3-1-27 Sakae-cho, Higashimurayama-shi, Tokyo-to; Masashi Ohno, 2-9-9-301 Gakuenhigashi-machi, Kodaira-shi, Tokyo-to; Takashi Morita, 3-24-6 Shirayuri, Izumi-ku, Yokohama-shi, Kanagawa-ken, all of Japan

[21] Appl. No.: 757,325

[22] Filed: Sep. 10, 1991

[30] Foreign Application Priority Data

Sep. 12, 1990 [JP] Japan .................... 2-239831

[51] Int. Cl.[6] .................... H04L 12/56; H04L 12/46
[52] U.S. Cl. .................... 370/60.1; 370/85.13; 370/94.2; 370/79
[58] Field of Search .................... 370/85.13, 85.14, 370/85.15, 94.1, 94.2, 60, 60.1, 85.11, 62, 94.3, 79, 82

[56] References Cited

U.S. PATENT DOCUMENTS

| | | | |
|---|---|---|---|
| 4,665,514 | 5/1987 | Ching | 370/94.1 |
| 4,740,955 | 4/1988 | Litterer | 370/85.11 |
| 4,764,919 | 8/1988 | Hunter | 370/94.1 |
| 4,787,082 | 11/1988 | Delaney | 370/94.2 |
| 4,905,231 | 2/1990 | Leung | 370/94.1 |
| 4,947,388 | 8/1990 | Kuwahara | 370/60 |
| 4,975,906 | 12/1990 | Takiyasu et al. | 370/85.13 |
| 5,012,466 | 4/1991 | Buhrke et al. | 370/62 |
| 5,038,343 | 8/1991 | Lebizay | 370/60 |
| 5,062,106 | 10/1991 | Yamazaki | 370/94.1 |
| 5,124,977 | 6/1992 | Kozaki | 370/60 |
| 5,303,233 | 4/1994 | Sugawara | 370/60 |

OTHER PUBLICATIONS

"Evolution From ISDN To Broad Band ISDN"; Telecom Tokyo Forum'90 Program & Abstracts, Feb. 19–20, 1990.
Broadband Aspects of ICDN CCITT Recommendations, pp. 34–61, Nov. 14–25, 1988.
Tanaka, "A Consideration on ATM Technology in Private Networks" Nov. 27–30, 1989.
The Institute of Electronics, InformatiOn and Communication Engineers, "An ATM Interface of Flexible Multiplexer for Broadband Subscriber Loop Systems", J. Yanagi, et al., Autumn National Meeting, 1989.

Primary Examiner—Wellington Chin
Assistant Examiner—Chau T. Nguyen
Attorney, Agent, or Firm—Antonelli, Terry, Stout & Kraus

[57] ABSTRACT

A network broadcast system having at least one local area communication network connecting apparatus which interconnects LANs and PBXs electrically connected thereto. The local area communication network connecting apparatus includes at least one LAN connecting unit, connected to a LAN for converting a LAN frame transmitted from the LAN to a cell including a VCI which identifies a desired destination of the cell, at least one PBX connecting unit, connected to a PBX for converting an audio signal from the PBX to a cell and a converting unit, connected to the LAN connecting unit, the PBX connecting unit and a plurality of output paths. The converting unit responds to a VCI in a cell transferred thereto, adds at least an output path number which identifies an output path connected between the converting unit and a desired destination of the cell and outputs the cell to the output path identified by the output path. The converting unit includes a table having a plurality of entries for establishing relationships between VCIs and output path numbers.

24 Claims, 13 Drawing Sheets

FIG. 8

| TYPE OF VCI | VALUES TO BE ASSIGNED | |
|---|---|---|
| | DECIMAL NOTATION 10 | BINARY NOTATION 2 |
| LAN INTER-CONNECTION<br>(INTERCONNECTION BETWEEN LANS) | 0 ∼ 262143 | TWO LEFTMOST bits<br>$\boxed{0\ 0}\ X_1\ X_2\ \cdots\ X_{18}$<br>$X_n = 1\ \text{OR}\ 0$ |
| BROADCAST | 262144 ∼ 524287 | TWO LEFTMOST bits<br>$\boxed{0\ 1}\ Y_1\ Y_2\ \cdots\ Y_{18}$<br>$Y_n = 1\ \text{OR}\ 0$ |
| AUDIO CALL | 524288 ∼ 1048575 | TWO LEFTMOST bits<br>$\boxed{1\ 1}\ Z_1\ Z_2\ \cdots\ Z_{18}$<br>$Z_n = 1\ \text{OR}\ 0$ |

NETWORK BROADCAST COMMUNICATION SYSTEM AND COMMUNICATION NETWORK CONNECTING APPARATUS

TECHNICAL FIELD OF THE INVENTION

The present invention relates to a network broadcast communication system for interconnecting a plurality of networks and a connecting apparatus used to connect the networks and more particularly to a local area communication network connecting apparatus for connecting local area networks and private branch exchanges so as to control the throughput of messages in the system at high speed.

BACKGROUND OF THE INVENTION

Recent user demands for high speed and multimedia communications have resulted in the need for high speed local area network (LAN) interconnection capability beyond local premises, integrated multimedia communication facilities for local premises and efficient inter-sites multimedia communication facilities. Particularly, there is a great need for high speed interconnection capability between LANs located in different sites.

Japanese Application 63-169849 discloses a broadcast communication control system operation under a conventional packet switching mode using a virtual circuit system. According to Japanese Application 63-169849 each exchange office has a memory in which information about the relationship between logic channel numbers and broadcast call identification numbers are stored. A logic channel number identifies for each exchange office the broadcast number identifies for each exchange office the broadcast paths of data in the form of broadcast cells to be transmitted from broadcast terminals to a plurality of reception terminals as broadcast communication destinations. A broadcast call identification number identifies a broadcast call.

The system disclosed by Japanese Patent application 63-169849 writes an identification number used for the broadcast call into a header of a broadcast packet so as to transfer the thus written number to a packet transfer network. The packet transfer network performs the relocation of a header only with respect to defined logic channels for output to outgoing lines, carries out conversion of the header to another header and transfers the header and the associated packet to each of the outgoing lines. In each exchange office, so as long as the logic channel numbers are defined in the memory as being related to broadcast call identification numbers with respect to the outgoing lines, a desired logic channel number at an outgoing line to which a broadcast package is to be transferred is obtained from the memory. Thus, a broadcast package may be delivered to a desired outgoing line.

In the system disclosed in Japanese Patent Application 63-169849 first the broadcast call identification number for the broadcast call is obtained from the logic channel number in each exchange office. The broadcast call identification number is then written into the header of the broadcast packet. Thereafter, the logic channel number for the outgoing line is determined from the broadcast call identification number thus changing the incoming logic channel number to the logic channel number for the outgoing line. Therefore, when the transfer of data at high speed is made in the conventional system the data exchange processing becomes more complicated being that at least two different processes must be performed. This increases the overhead of the exchange office thereby reducing its throughput. The overhead is defined as the number of required steps that must be performed in preparation for performing a desired step. Therefore, high speed interconnection of LANs located in different sites is not possible with the conventional systems.

SUMMARY OF THE INVENTION

It is an object of the present to reduce the overhead of performing data exchange processing thereby permitting the system to perform high speed interconnection between LANS located at different sites.

In order to achieve the above object, the present invention provides a method and apparatus of communicating simultaneous with all points in a network. Particulary the present invention provides apparatus and a method therefore of performing the operations of registering a virtual channel identifier (VCI) defined uniquely in the network for each cell generating unit connected to either a local area network (LAN) or a private branch exchange (PBX) and transferring a cell based on the same VCI between a LAN as a source of the transmission of the cell and a LAN as a cell destination thereby eliminating unnecessary processing.

The VCI in the cell is set once in the above described operation when the cell is generated from a LAN frame transmitted on the LAN and the same VCI is used throughout the system to direct the cell to its desired destination. Relationships are established between VCIs and outgoing lines in order to permit the VCI and its associated cell to be directed to one of the outgoing lines connected to the desired destination of the cell.

Cells generated from LAN frames are provided with a cell header including a VCI which identifies the desired destination of the cell and a adaption header which provides information to permit the cell to be reorganized or reset into a LAN frame for transmission to the desired destination LAN.

The present invention provides a network broadcast communication system for interconnecting LANs and PBXs. The network broadcast system of the present invention provides a local area communication network connecting apparatus which interconnects LANs and PBXs electrically connected thereto. The local area communication network connecting apparatus includes at least one LAN connecting unit, electrically connected to a LAN for converting a LAN frame transmitted from the LAN to a cell including a VCI which identifies a desired destination of the cell, at least one PBX connecting unit, electrically connected to a PBX for converting an audio signal transmitted from the PBX to a cell including a VCI which identifies a desired destination of the cell and a converting unit, electrically connected to the LAN connecting unit, the PBX connecting unit and a plurality of output paths. The converting unit responds to a VCI included in a cell from either the LAN connecting unit or the PBX connecting unit, adds at least an output path number which identifies an output path connected between the converting unit and a desired destination of the cell and outputs the cell to the output path identified by the output path number. The converting unit includes a table having a plurality of entries for establishing relationships between VCIs received from the LAN connecting unit and the PBX connecting unit and output path numbers each identifying an output path connected between the converting unit and a particular destination.

Provided in each of the output paths connected to the converting unit is a synchronized optical network (SONET)

converting unit which converts the cell from the converting unit into a SONET frame for transmission on a dedicated digital line. Each dedicated digital line is an optical fiber communication line.

The local area communication area network connecting apparatus can also receive cells from other local area communication network connecting apparatus for transmission to the LAN connected thereto. In this regard each local area communication network connecting apparatus includes a cell resolving unit for receiving a cell and resolving the received cell into a header and user information, a frame generation control unit for outputting a frame generation control signal in response to the header and a frame generating unit for setting up a LAN frame from the user information based on the frame generation control signal from the frame generation control unit. The LAN frame formed by the frame generating unit is transmitted to the LAN connected to the local area communication network connecting apparatus.

BRIEF DESCRIPTION OF THE DRAWINGS

The features of the present invention which are believed to be novel are set forth with particularity in the appended claims. The invention may be best understood, however, by reference to the following description in conjunction with the accompanying drawings in which:

FIG. 8 illustrates a table for assigning values to the VCIs according to its type;

DESCRIPTION OF THE PREFERRED EMBODIMENT

Figure 1:
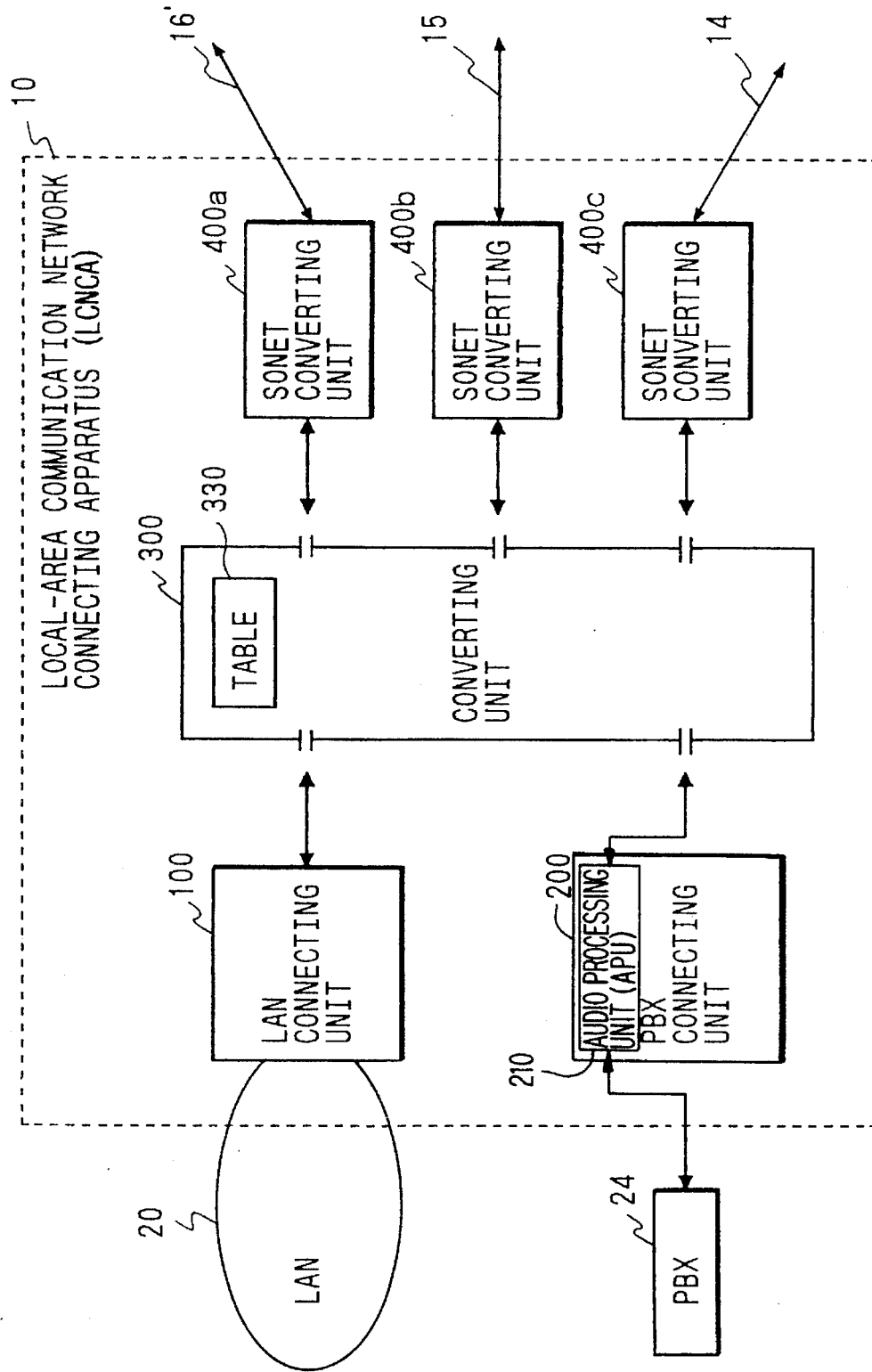
FIG. 1 illustrates the local area communication network connecting apparatus of the present invention.

FIG. 1 shows one embodiment of a local area communication network connecting apparatus 10 of the present invention. The local area communication network connecting apparatus 10 includes a local area network (LAN) connecting unit 100, a private branch exchange (PBX) connecting unit 200, a converting unit 300 and synchronized optical network (SONET) converting units 400a, 400b, 400c. Dedicated digital lines 16, 15 and 14 are connected to the SONET converting units 400a–c, respectively. The dedicated digital lines are optical fiber communication lines.

Figure 2:
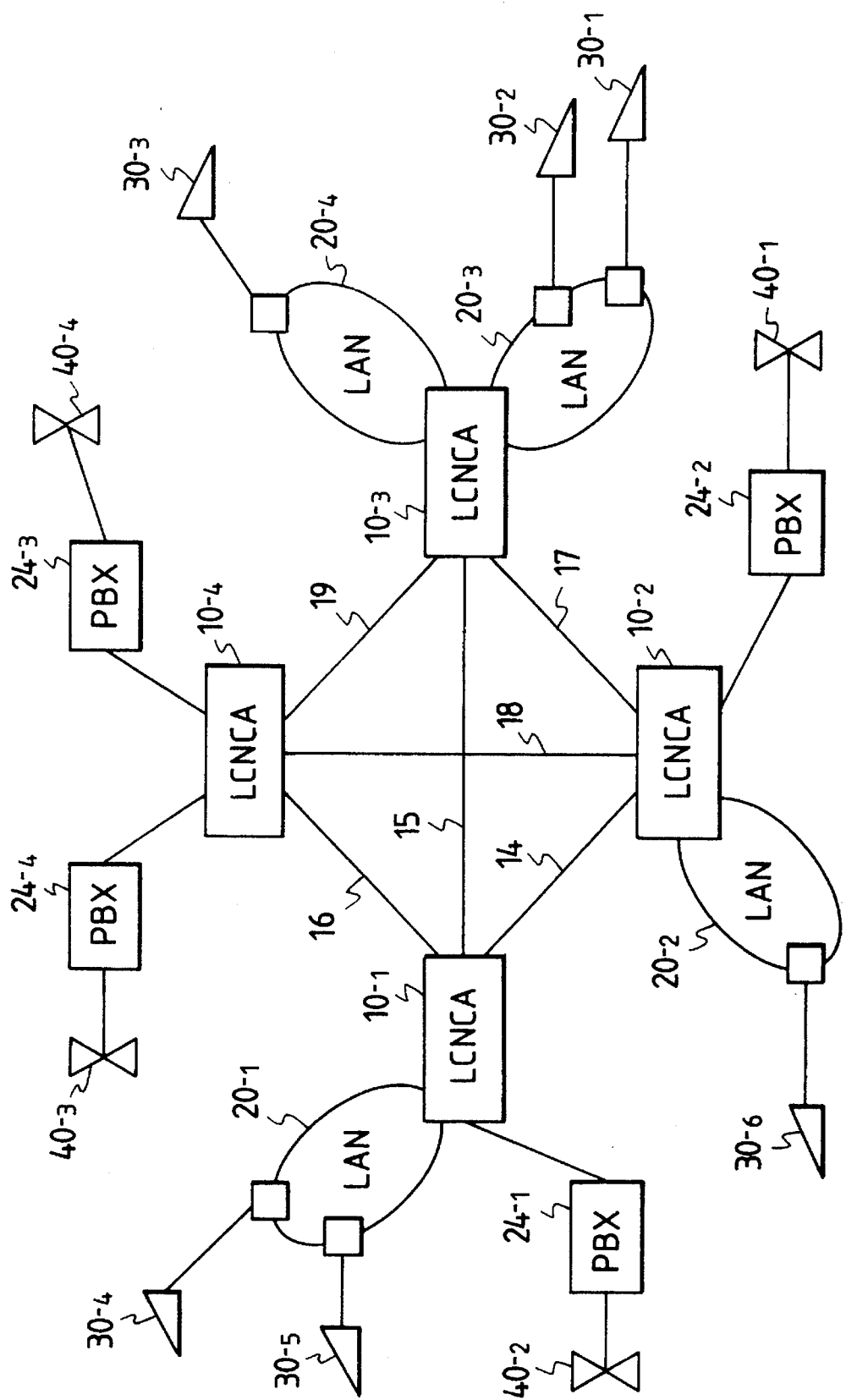
FIG. 2 illustrates a network system including the local area communication network connecting apparatus of the present invention.

The converting unit 300 includes a routing table 330 which will be described in more detail below. The converting unit 300 is electrically connected to the LAN connecting unit 100 which is electrically connected to a LAN 20. The LAN 20 has electrically connected thereto one or more terminals 30 as shown in FIG. 2. Also the converting unit 300 is electrically connected to the PBX connecting unit 200 which is electrically connected to a PBX 24. The PBX 24 has electrically connected thereto a plurality of telephones represented by element 40. Each SONET converting unit 400 is electrically converted to an output path of the converting unit 300. Each SONET 400 converts a broadcast cell which is an electrical signal into an optical signal and transmits the optical signal on the dedicated digital line 14, 15, 16 connected thereto.

FIG. 2 illustrates one example of a network system constructed by making use of local area communication network connecting apparatuses 10-1 to 10-4 according to the present invention. The local area communication network connecting apparatuses 10-1 to 10-4 as shown in FIG. 2 are interconnected in the form of a mesh by dedicated digital lines 14-19. The interconnection of the local area communication network connecting apparatuses 10-1 to 10-4 effectively interconnects the PBXs 24 and the LANs 20.

Figure 3:
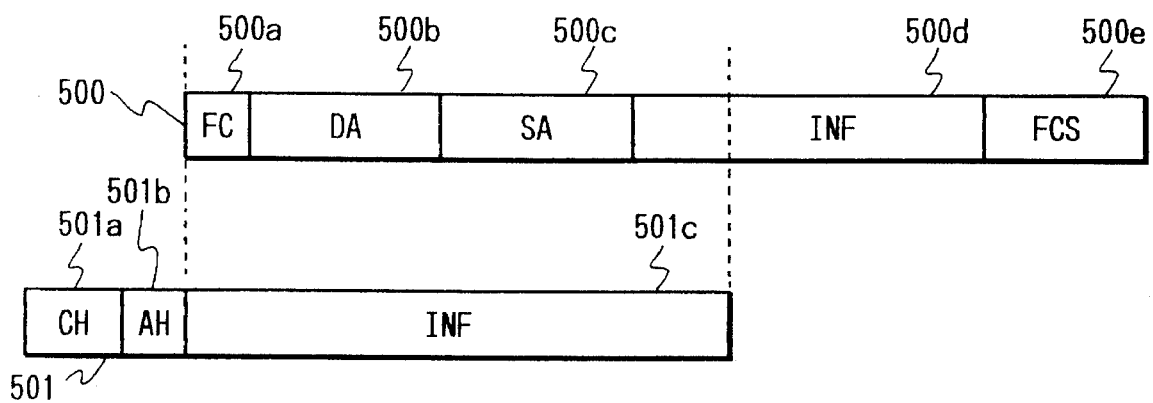
FIG. 3 illustrates a LAN frame and a broadcast cell.

When data is transmitted from a terminal 30 on the LAN 20 it is transmitted in the format of a LAN frame 500 as shown in FIG. 3. A terminal 30-4 connected to LAN 20-1 which desires to send data to terminal 30-3 connected to LAN 20-4 generates a LAN frame which is received by the local area communication network connecting apparatus 10-1. Local area communication network connecting apparatus 10-1 performs processing on the LAN frame so as to form a broadcast cell and transmits the broadcast cell to local area communication network connecting apparatus 10-3 via dedicated digital line 15. Thereafter, the broadcast cell from local area communication network connecting apparatus 10-1 is reformed into a LAN frame and transmitted to terminal 30-3 connected to LAN 20-4.

The LAN connecting unit 100 included in the local area communication network connecting apparatus 10 as shown in FIG. 1 is an interface unit for interfacing with the LAN 20 electrically connected thereto. When a cell is to be set up for transmission based on a LAN frame transferred from the LAN 20, first control information (hereinafter called "cell header") required to direct the cell to the desired destination and second control information (hereinafter called "adaptation header") required to reset up or reorganize the cell to a LAN frame are added to the cell. The cell with the added information is then sent to the converting unit 300.

FIG. 3 shows the LAN frame and the cell employed in the present invention. The LAN frame 500 includes frame control information (FC) 500a, a destination address (DA) 500b, a source of transmission address (SA) 500c, user information (INF) 500d and a frame check sequence (FCS) 500e. A cell 501 as shown in FIG. 3 generated based on a LAN frame includes, as described above a cell header (CH) 501a, an adaptation header (AH) 501b and user information (INF) 501c. The cell 501 includes 44 bytes of one LAN frame 500 as shown in FIG. 3. The remaining bytes of the LAN frame 500 is placed in at least one subsequent cell 501.

In FIG. 2 when telephone 40-2 generates an audio signal to the be sent to telephone 40-4, PBX 24-1 transfers an audio signal to local area communication network connecting apparatus 10-1. Local communication network connecting apparatus 10-1 processes the audio signal to form a broadcast cell which is transmitted to local area communication network connecting apparatus 10-4 along dedicated digital line 16. Local area communication network connecting apparatus 10-4 reforms the cell into an audio signal and sends the audio signal to the PBX 24-3.

The PBX connecting unit 200, as illustrated in FIG. 1, included in the local area communication network connecting apparatus 10 is an interface unit for interfacing with the PBX 24 electrically connected thereto. When an audio cell is to be set up for transmission based on an audio signal transferred from the PBX 24, the audio signal is processed by an audio processing unit 210 which forms an audio cell and adds a cell header and an adaptation header as described above to the audio cell. The resulting cell with the added information is transferred to the converting unit 300. When an audio signal is to be transferred from the converting unit 300 to the PBX 24 based on an audio cell, the audio cell is processed by the audio processing unit 210 to form an audio signal which is transferred to the PBX 24.

Each of the above described cell headers added to the cells from the LAN connecting unit 100 and the PBX connecting unit 200 includes a virtual channel identifier (VCI) which identifies the desired destination of the cell. For example, when terminal 30-4, as shown in FIG. 2 desires to send a message to terminal 30-6 in LAN 20-2 the cell header added to the cell corresponding to the LAN frame transmitted from the terminal 30-4 includes a VCI which identifies the terminal 30-6 as the desired destination of the cell.

The converting unit 300 receives cells including cell headers from either the LAN connecting unit 100 or the PBX connecting unit 200 or the SONET converting unit 400. The VCI included in a cell header of a cell from either the LAN connecting unit 100 or the PBX connecting unit 200 or the SONET converting unit 400 is converted from an input VCI (hereinafter called "input VCI") into an output path number and where appropriate on an output VCI (hereinafter called "output VCI"). The output path number identifies a particular output path connected between the converting unit 300 and the desired destination.

Prestored route information is included in a routing table 330 as shown in FIG. 3. The routing table 330, as described above, is included in the converting unit 300. As shown in FIG. 3 the routing table has a plurality of entries, wherein each entry relates an input VCI to an output path number which identifies a particular output path and possibly an output VCI depending on the output path to be transmitted to.

The converting unit 300 retrieves the routing table 330 and applies thereto the input VCI of a cell transferred from either the LAN connection unit or the PBX connecting unit 200 or the SONET converting unit 400. Applying the input VCI to the routing table 330 causes the converting unit 300 to determine a particular output path number which identifies a particular output path connected between the converting unit 300 and the desired destination. The converting unit 300 outputs the cell to the desired destination via the output path identified by the output path number. When the input VCI applied to the routing table is not registered therein, the input VCI is not converted thereby.

Figure 4:
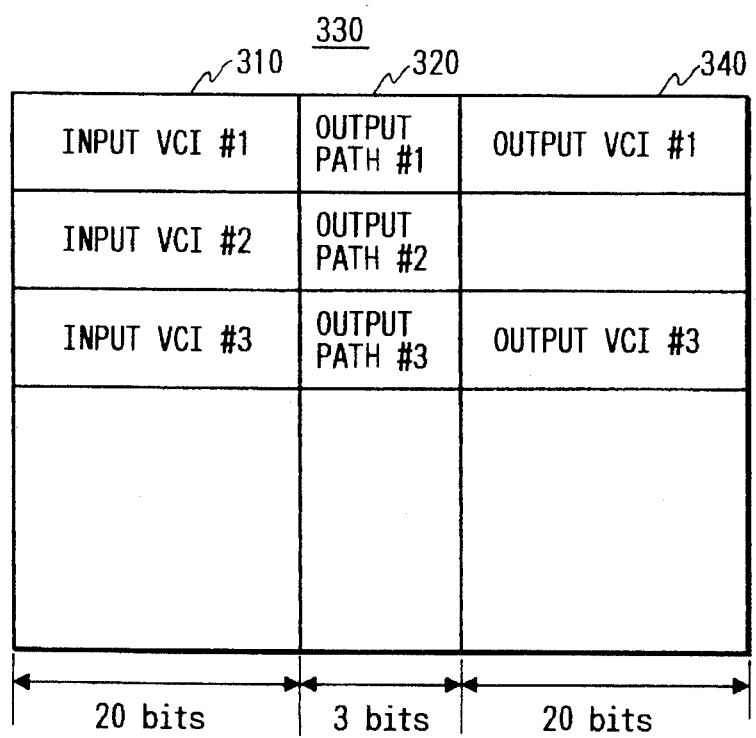
FIG. 4 illustrates the structure of the routing table of the present invention.

FIG. 4 illustrates the structure of the routing table 330. Output path numbers 320 and output VCIs 340 are registered in the routing table 330 as information which are related to the input VCIs 310. The unit VCIs, as described above, correspond to VCIs in cells transferred form either the LAN connecting unit 100, the PBX connecting unit 200 or the SONET converting unit 400. If the input VCI is a multiple or broadcast VCI, only the output path numbers 320 are registered in the routing table. Output VCIs 340 are not registered for input VCIs which are multiple or broadcast VCIs.

In the present invention the input VCIs 310, the output VCIs 340 and the output path numbers 320 are fixedly registered in the routing table 330. In FIG. 4 one output path number 320 is shown as being assigned to one input VCI 310. However, a plurality of output path numbers 320 can be assigned to a single input VCI by extending the routing table 330. When a plurality of output path numbers 320 are assigned to one input VCI 310 a cell formed by adding the output path number to the input VCI is outputted to each of the plurality of output paths from the converting unit 300.

Each cell outputted from the converting unit 300 is set up in the form of a SONET frame in the SONET converting unit 400 so as to be outputted to a dedicated digital line 14, 15, 16, 17 and 19 connected thereto.

The SONET frame received via a digital dedicated line 14, 15, 16, 17, 18 and 19 is decomposed or resolved into the form of a cell in the SONET converting unit 400 and transferred to the converting unit 300. The converting unit 300 retrieves the routing table 330 by using the VCI of the cell being transferred from the SONET converting unit 400 so as to determine an output path of the cell. If the output path registered in the routing table is one electrically connected to the LAN connecting unit 100 then the cell is transferred to the LAN connecting unit 100. However, if the output path is one electrically connected to the PBX connecting unit 200, then the cell is transferred to the PBX connecting unit 200. Further, when the output path is connected to one of the other local area communication network connecting apparatus 10 through the SONET converting unit 400 then the cell is transferred to the local area communication network connecting apparatus 10 through the SONET connecting unit 400.

The LAN connecting unit 100 and the PBX connecting unit 200 reproduces either a LAN frame or an audio signal from the cell transferred thereto so that the LAN frame or the audio signal can be output to the LAN 20 or the PBX 24, respectively.

In the system shown in FIG. 2 the local area communication network connecting apparatus 10-3 which is only connected to LANs 20-3 and 20-4 includes only a LAN connecting unit 100, a converting unit 300 connected to the LAN connecting unit and SONET converting units 400 connected to the converting unit 300. Further, the local area communication network connecting apparatus 10-4 as shown in FIG. 2 as being only connected to PBXs 24-3 and 24-4 includes only a PBX connecting unit 200, a converting unit 300 connected to the PBX connecting unit 200 and SONET converting units 400 connected to the converting unit 300.

Figure 5:
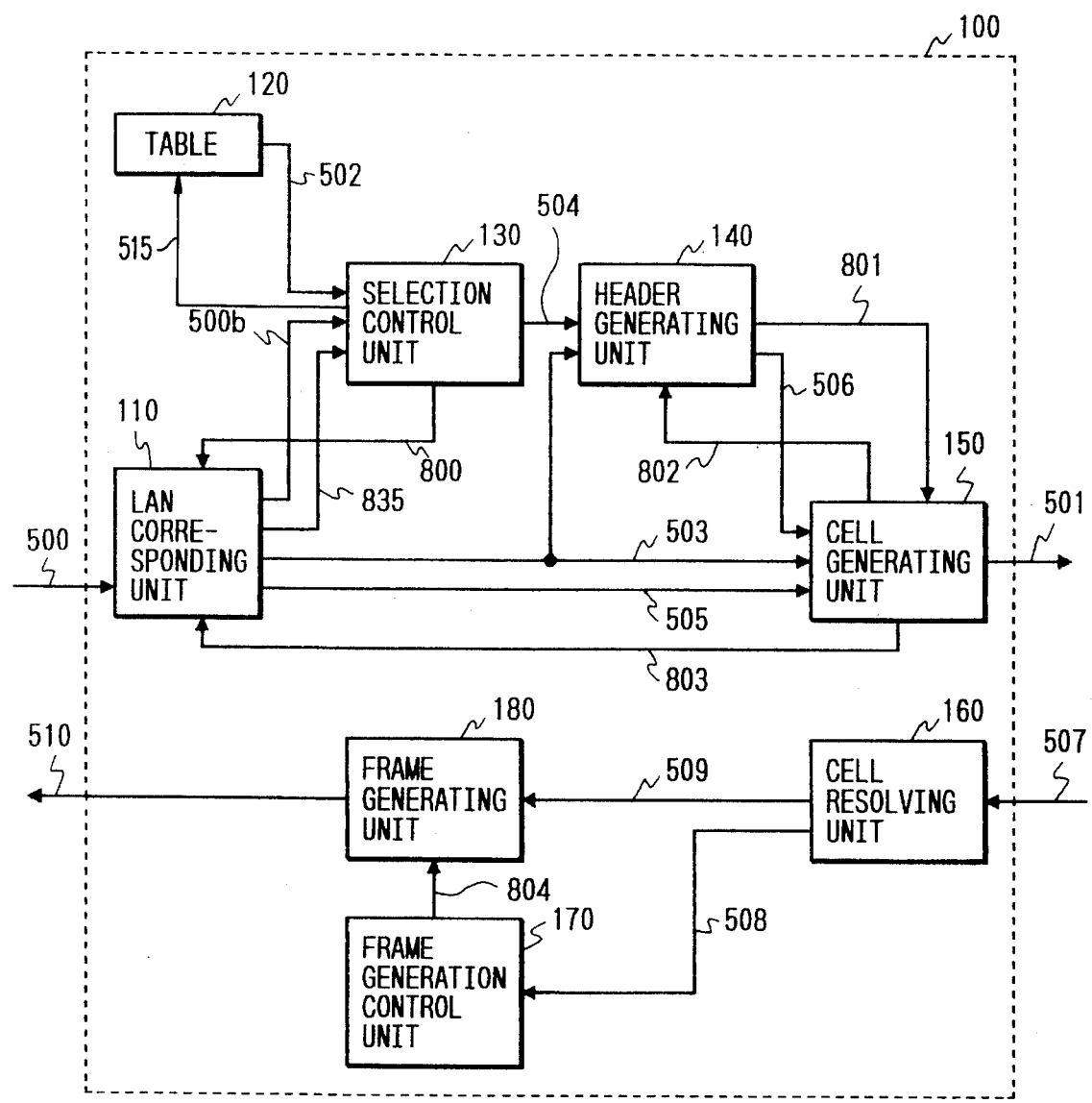
FIG. 5 illustrates the LAN connecting unit of the present invention.

The LAN connecting unit 100 is shown in more detail in FIG. 5. The LAN connecting unit 100 has at least one LAN corresponding unit 110 which has stored therein a unique LAN number assigned to the LAN electrically connected to the LAN corresponding unit 110. In response to a LAN frame 500 received by the LAN corresponding unit 110, the LAN corresponding unit 110 outputs the LAN number as LAN number signal 835. The LAN corresponding unit 110 is shown in more detail in FIG. 6.

The LAN connecting unit 100 shown in FIG. 5 stores in the LAN corresponding unit 110 the inputted LAN frame 500 in the form of a frame unit. A selection control unit 130 reads a MAC-layer destination address (hereinafter called "DA") 500b generated by the LAN corresponding unit 110 in response to receipt of the LAN frame 500. The selection control unit 130 also receives the LAN number signal 835 from the LAN corresponding unit 110.

The selection control unit 130 makes a judgement as to whether the LAN frame 500 is a terminal destination frame (hereinafter called "local-in destination frame") accommodated in the LAN 20 which is directly connected to the LAN corresponding unit 110 or a terminal destination frame (hereinafter called "local-out destination frame") contained in a LAN which is electrically connected to another LAN corresponding unit of the same LAN connecting unit or to another LAN connecting unit 100 in another local area communication network connecting apparatus 10. This judgment is performed based on the DA signal 500b, LAN number signal 835 and selection processing information 502 read from a selection table 120 by terminal address read control 515. If the LAN frame is judged to be a local-in destination frame, the selection control unit 130 delivers a frame reject signal 800 to the LAN corresponding unit 110 so as to reject the LAN frame 500. However, if the LAN frame is judged to be a local-out destination frame, the selection control unit 130 transfers exchange control information 504 to a header generating unit 140. The header generating unit 140 generates a header signal 506 and a header generation completion signal 801 which indicates the completion of header generation based on a frame length signal 503 indicating a length of a LAN frame from the LAN corresponding unit 110 and the exchange control information 504. The header signal 506 in the present invention is a general term for the cell header 501a and the adaptation header 501b shown in FIG. 3. A cell generating unit 150 receives the header signal 506 and the header generation completion signal 801 from the header generating unit 140 and applies a read control signal 802 to the header generating unit 140. The cell generating unit 150 also receives a LAN frame 505 from the LAN corresponding unit 110 by applying a frame information read control signal 803 to the LAN corresponding unit 110. Thus the cell generating unit based upon the frame length signal 503, the LAN frame 505, the header signal 506 and the header generation completion signal generates a cell 501.

The foregoing describes a process of setting up a cell based upon a LAN frame and transmitting the cell from the LAN connecting unit 100 to the converting unit 300. A description will now be made of a process of receiving a cell and setting up a LAN frame based on the received cell.

A cell resolving unit 160 included in the LAN connecting unit 100 as shown in FIG. 5 serves to resolve a received cell 507 into a received header signal 508 and a received user information signal 509. The received header signal 508 is transferred to a frame generation control unit 170 and the received user information signal 509 is transferred to a frame generating unit 180. The frame generation control unit 170 is activated in response to the received header signal 508 to control the frame generating unit 180 in accordance with a frame generation control signal 804. Specifically the frame generation control unit 170 operates in response to information included in the adaption header 501b shown in FIG. 3 of the header of the received cell. The information contained in the adaptation header 501b causes the frame generation control unit 170 to generate the frame generation control signal 804 to reset or reorganize the received cell to a LAN frame. The frame generating unit 180 sets up a LAN frame 510 from the received user information signal 509 based on the frame generation control signal 804. The LAN frame 510 set up by the frame generating unit 180 is transferred to the LAN 20 electrically connected thereto.

A detailed description will hereinafter be made of other elements included in the LAN connecting unit 100 in FIGS. 6 through 12.

Figure 6:
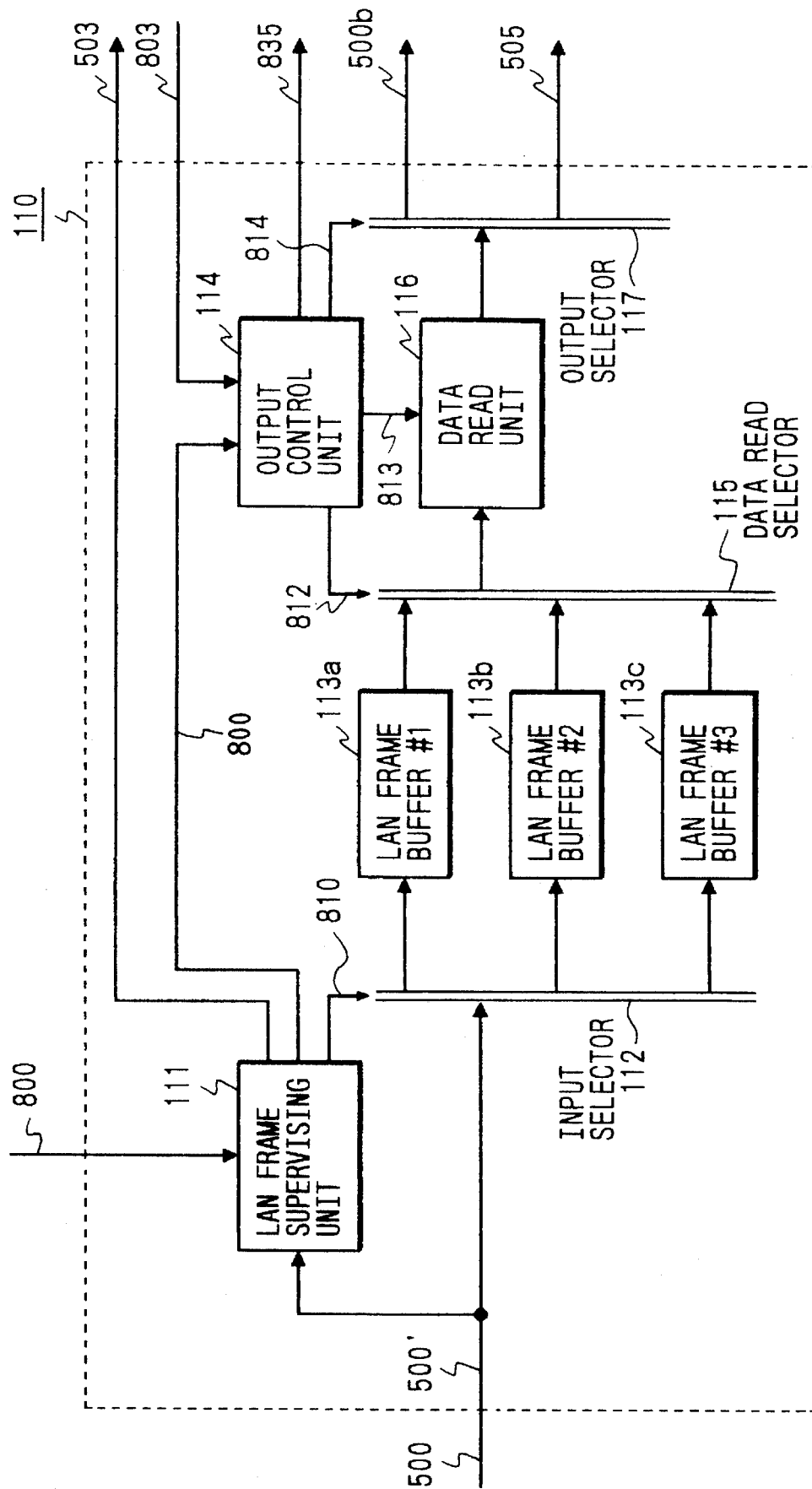
FIG. 6 illustrates the LAN corresponding unit of the present invention.

FIG. 6 shows the structure of the LAN corresponding unit 110. As shown in FIG. 6 the LAN frame 500 is inputted to a first LAN frame buffer 113a through an input selector 112. The input selector 112 is controlled by a LAN frame supervising unit 111 in accordance with an input selector control signal 810. The LAN frame supervising unit 111 transmits a frame input completion signal 811 to an output control unit 114 at the time of completion of inputting of the LAN frame 500 to the first LAN frame buffer 113a. In addition, the LAN frame supervising unit 111 controls the input selector 112 in accordance with the input selector control signal 810 in such a manner that the LAN frame 500' following the LAN frame 500 is inputted to a second LAN frame buffer 113b and so on. In the present invention the LAN supervising unit 111 further controls the input selector 112, so that a LAN frame inputted after a LAN frame has been input to a third LAN frame buffer 113c is inputted to the first LAN frame buffer 113a. The LAN frame supervising unit 111 supervises the input LAN frame 500 to recognize the length of each LAN frame, thereby outputting the frame length signal 503 to the header generating unit 140. Further, when the LAN frame supervising unit 111 receives the frame reject signal 800 from the selection control unit 130, the LAN frame supervising unit 111 controls the input selector 112 in such a way that a LAN frame to be inputted next is overwritten into the LAN frame buffer 113 designated by the frame reject signal 800.

The output control unit 114 serves to control a data read selector 115 and a data read unit 116 based on the frame input completion signal 811. The output control unit 114 controls the data read selector 115 in accordance with a data read selector control signal 812 output thereby to the data read selector 115. The data read selector control signal 812 causes the data read selector 115 to select a LAN frame buffer 113 from which a DA signal 500b may be read. The DA signal 500b is read from the selected LAN frame buffer 113 by controlling the data read unit 116 in accordance with a data read control signal 813 and controlling an output selector 117 in accordance with an output selector control signal 814. The so-read DA signal 500b is output to the selection control unit 130.

The output control unit 114 also controls the data read selector 115 and the data read unit 116 based on a frame-information read control signal 803 outputted from the cell generating unit 150. The output control unit 114 is activated to control the data read selector 115 in accordance with the control signal 812, thereby designating a LAN frame buffer 113 from which a LAN frame 505 may be read. The output control unit 114 controls the data read unit 116 in accordance with the data read control signal 813 and also controls the output selector 117 in accordance with the output selector control signal 814 so as to read a desired LAN frame 505 from the LAN frame buffer in the form of a 44 byte unit. The thus-read LAN frame 505 is output to the cell generating unit 150.

In FIG. 6 three LAN frame buffers 113 are shown. However, the number of buffers is a value determined by the scale of the LAN to be connected, and the transmission speed thereof, or the processing capability of the LAN connecting unit 100, and the like.

Figure 7:
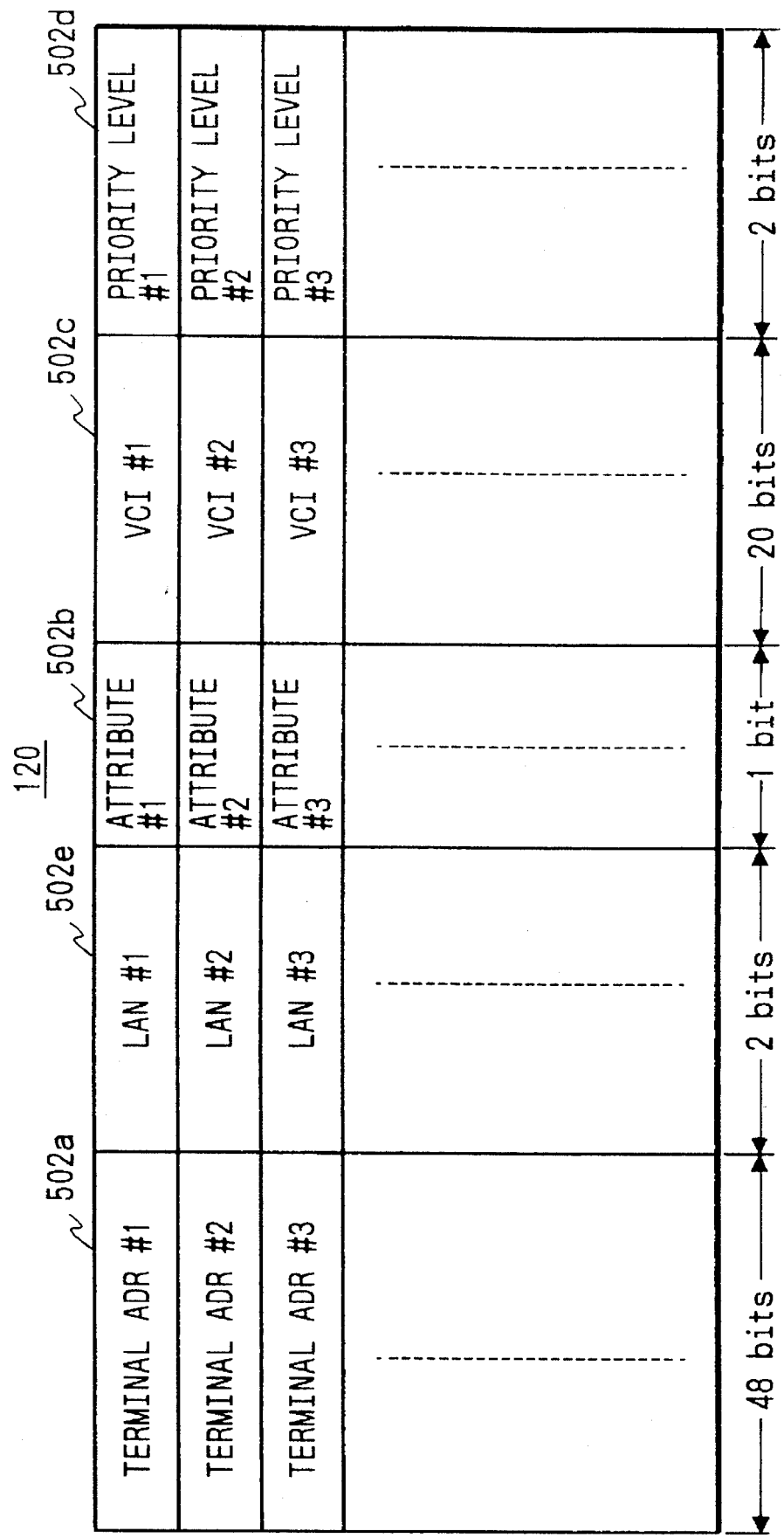
FIG. 7 illustrates the selection table of the present invention.

The structure of the selection table 120 will now be described in reference to FIG. 7.

Selection process information 502 is registered in a plurality of entries in the selection table 120. Each selection process information 502 comprises subinformation including a terminal address (48 bits) 502a, an attribute (1 bit) 502b, a VCI (20 bits) 502c, a LAN number (2 bits) 502e, and a priority level (2 bits) 502d. As shown in FIG. 7, each subinformation including the attribute, the VCI and the priority level is registered in the selection table 120 as information which belongs to the terminal address and the LAN number. When one LAN is electrically connected to the LAN connecting unit 160, the LAN number is not registered in the selection table 120. In other words, the LAN number 502e thereof is not included in the table 120. The VCI is used for interconnections between LANs. Distinctions are made in the VCI, wherein a VCI used for a broadcast or multiple cell transmission is different from a VCI used for an audio cell.

In the present invention a VCI of 18 bits is produced by applying a LAN number of 9 bits to the LAN connected to the LAN connecting unit 100 and combining a LAN number of a LAN which accommodates an origin terminal, i.e., a master station with a LAN number of a LAN which accommodates a reception terminal, i.e., an accepting station. The VCI applied to the cell is represented in the form of 20 bits. However, the eighteen right most or low-order bits are represented as mentioned above, and the two left most or high-order bits show that the VCI is used for the interconnection between the LANs. Since the VCI used for the interconnection between LANs is stored at its corresponding terminal address in the selection table 120, the VCI mentioned above is held when the system fails. Assuming that a VCI used for communication between a terminal 30-4 accommodated in the LAN 20-1 and a terminal 30-1 contained in the LAN 20-3 as shown in FIG. 1 is 5142 by way of example. In this case, a VCI used for communication between a terminal 30-5 contained in the LAN 20-1 and a terminal 30-2 accommodated in the LAN 20-3 is also 5142.

A description will now be made of the VCI used for the interconnection between the LANs, the VCI used for broadcast or multiple cell transmission and the VCI used for an audio call with reference to FIG. 8. As shown in FIG. 8, values of from 0 to 1048575 which can be adopted by VCI of 20 bits are used so as to be distributed to the respective VCIs. In the present embodiment, the values of from 0 to 262143 are assigned to VCIs used for the interconnection between LANs. When the values referred to above are represented in binary form of 20 bits, the two left most or high-order bits are 0, and the eighteen right most or low-order bits (X1 to X18) define a combination of a port of a LAN connecting unit 100 to which the LAN 20 accommodating the origin terminal is directly connected and a port of a LAN connecting unit 100 to which the LAN 20 containing the reception terminal is directly connected. The values of from 262144 to 524287 are assigned to VCIs used for broadcast or multiple cell transmission. When these values are represented in binary form of 20 bits, the second most significant bit is 1, and the most significant bit is 0. In addition, the eighteen lower-order bits (Y1 to Y18) define a port of a LAN connecting unit 100 as the source-of-transmission for the broadcast cell. The values of from 524288 to 1048575 are assigned to the VCI used for an audio call. When they are represented in binary form of 20 bits, the two left most bits are 1, and the eighteen right most bits (Z1 to Z18) define a Combination of a telephone sending set and a telephone answering set.

Figure 9:
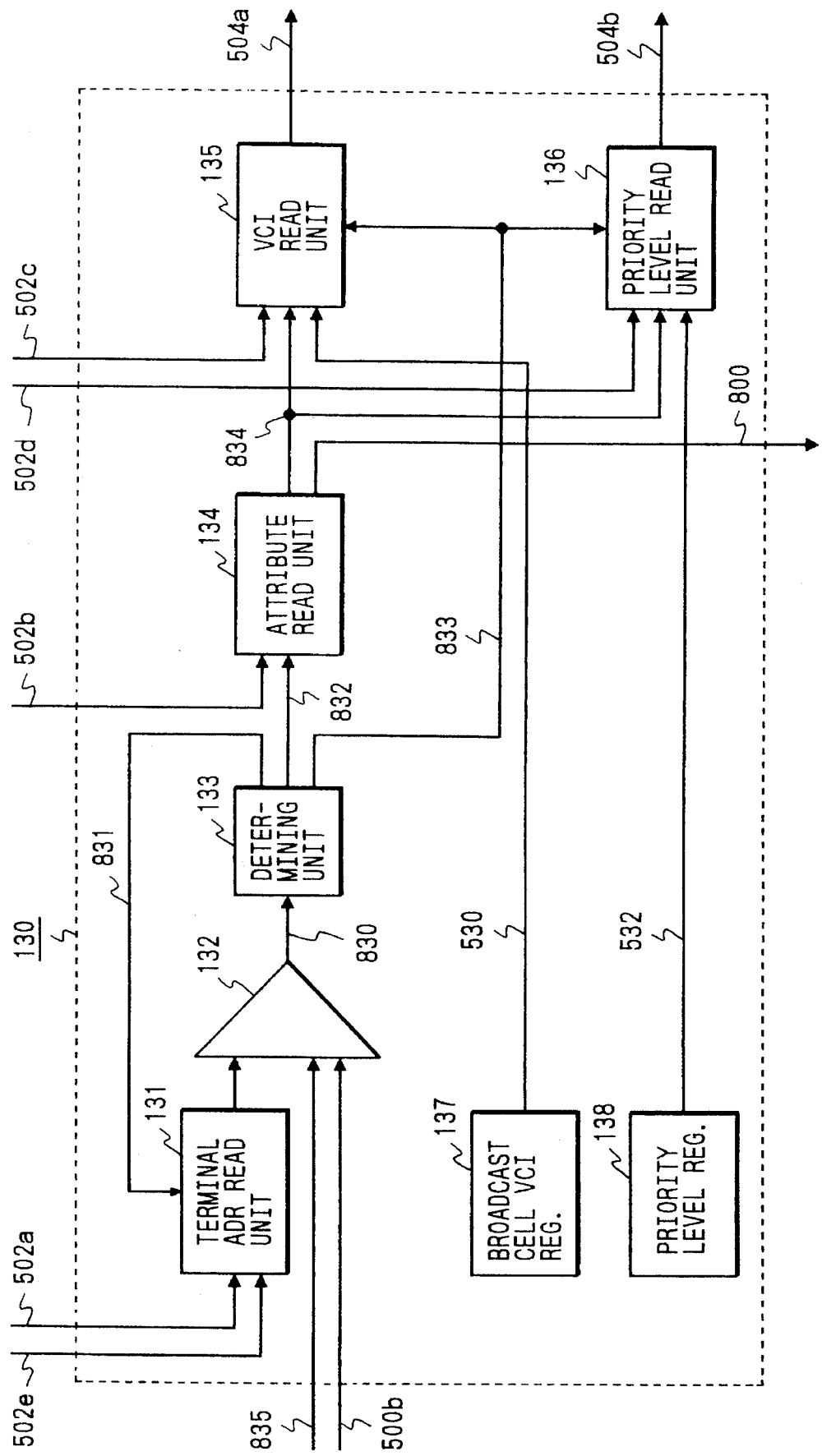
FIG. 9 illustrates the selection control unit of the present invention.

The structure of the selection control unit 130 will next be described in reference to FIG. 9. A comparator 132 compares a combination of the DA signal 500b and the LAN number signal 835 and a combination of the terminal address 502a and LAN number 502e from the selection table 120. The terminal address 502a and the LAN number 502 are combined in a terminal address read unit 131. If the result of comparison by the comparator 132 shows that they are not related to each other, a determining unit 133 transmits a terminal address read control signal 831 to the terminal address read unit 131 so as to read the next terminal address 502a and LAN number 502e from selection table 120. The reading of the terminal address 502a and the LAN number 502e from the selection table 120 by the terminal address read unit 131 and the processing for the comparison of the DA signal 500b and the LAN number signal 835 and the terminal address 502 and the LAN numbers 502e by the comparator 132 are carried out until a confirmation as to whether or not the result of its comparison output as result signal 830 shows that they are related to each other or whether or not all the terminal addresses and LAN numbers registered in the selection table 120 are not related to the DA signal 506 and the LAN number signal 835 output as DA unregistered signal 833.

When the result signal 830 output by the comparator 132 shows that they are related to each other, the determining unit 133 transmits an attribute read control signal 832 to an attribute read unit 134. On the other hand, if it is confirmed that the combinations of all the terminal addresses and the LAN numbers are not related to each other, the determining unit 133 delivers the DA unregistered signal 833 to a VCI read unit 135 and a priority-level read unit 136.

The attribute read unit 134 reads an attribute 502b from the selection table 120 based on the attribute read control signal 832. The attribute 502b is an identifier used to indicate that a terminal address which coincides with the DA signal 500b is either an address applied to a terminal 30 accommodated in the LAN 20 connected directly to the LAN corresponding unit 110 or an address applied to a terminal 30 contained in a LAN 20 connected to another incoming line of the same LAN corresponding unit 110 or to another LAN corresponding unit 110. If the attribute 502b is the former, a LAN frame of the DA signal 500b is a "local-in destination frame", whereas if it is the latter, the LAN frame is a "local-out destination frame". If the LAN frame is a local-in destination frame, the attribute read unit 134 delivers the frame reject control signal 800 to the LAN corresponding unit 110. On the other hand, if the LAN frame is a local-out destination frame, the attribute read unit 134 delivers a VCI/priority-level read control signal 834 to the VCI read unit 135 and the priority-level read unit 136.

The VCI read unit 135 reads a VCI 502c from the selection table 120 based on the VCI/priority-level read control signal 834. When the VCI read unit 135 receives the DA unregistered signal 833, it reads a VCI for delivering the above-mentioned frame as a broadcast cell from a broadcast cell VCI register 137. Written into the broadcast cell VCI register 137 are values of 2262144 to 524287 assigned uniquely to an incoming line of the LAN connecting unit 100.

The priority-level read unit 136 reads a priority level 502d from the selection table 120 based on the VCI/priority-level read control signal 834. When the priority-level read unit 136 receives the DA unregistered signal 833, it reads a priority level for delivering the above-mentioned frame as a broadcast cell from a broadcast cell priority-level register 138. The priority level of the broadcast cell is written into the broadcast cell priority-level register 138.

Figure 10:
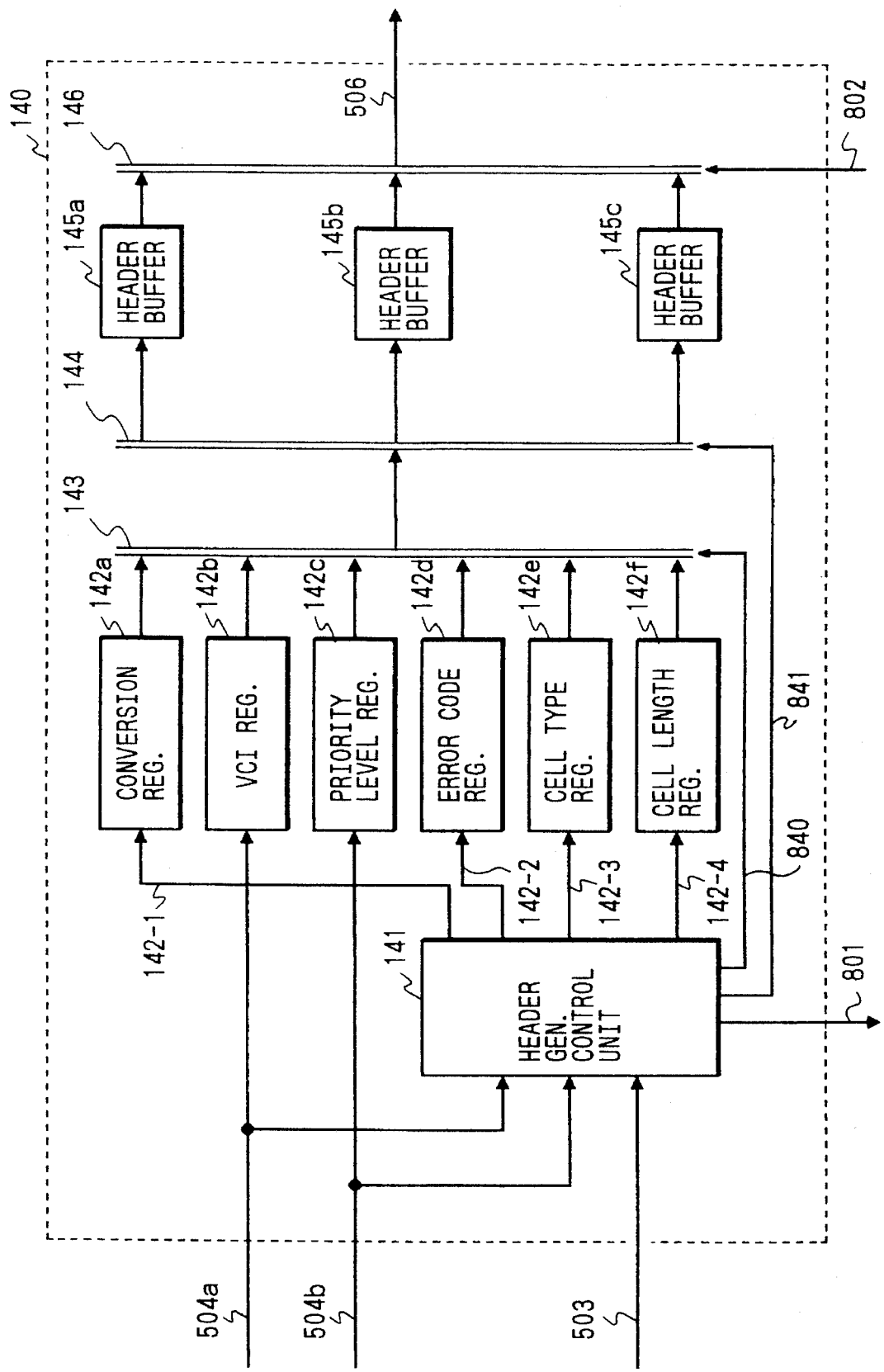
FIG. 10 illustrates the header generating unit of the present invention.

The structure of the header generating unit 140 will be described in reference to FIG. 10. The header generating unit 140 includes a header generation control unit 141 which generates conversion or exchange control information 142-1, an error control code 142-2, a cell type 142-3 and cell information length 142-4 from the frame length signal 503 of the LAN frame and a VCI 504a and a priority level 504a from the selection control unit 103. The header generation control unit writes the thus-generated data into each of a conversion control information register 142a, an error control code register 142d, a cell type register 142e, and a cell information length register 142f, respectively. The VCI 504a is written into a VCI register 142b from the VCI read unit 135, and the priority level 504b is written into a priority-level register 142c from the priority level read unit 136.

The conversion control information 142-1 includes a 8-bit control code determined based on the priority level 504b and is used for conversion control at the converting unit 300. The error control code 142-2 represents a 8-bit code and is used to error check the conversion control information 142-1, the VCI and the priority level. The error control code 142-2 is also used for the error checking of the cell header at the converting unit 300. The cell type 142-3 denotes a 2-bit identifier used to indicates to which section information about the LAN frame held in a cell corresponds wherein 0 indicative of "an intermediate cell of the LAN frame" is written into the cell type register 142e as an initialization value. The cell information length 142-4 shows a 6-bit value indicative of an effective information region of a cell. A value as a remainder, which is obtained by dividing the frame length 503 by user information length (44 bytes) of the cell is written into the cell information length register 142f as an initialization value.

Each header is produced by successively writing each header element including the conversion control information, the VCI, the priority level, the error control code, the cell type, and the cell information length into one of a plural header storage buffers 145a–c. The header generation control unit 141 controls a header generation selector 143 by use of a header generation control signal 840 outputted therefrom so as to select which of said header elements which are to be written into one of the plural header storage buffers 145a–c are from each of the registers 142a to 142f. Further, the header generation control unit 141 controls a header storage selector 144 by use of a header storage control signal 841 so as to select a header storage buffer 145 into which a header element is to be written. In addition, the header generation control unit 141 delivers a header generation completion signal 801 to the cell generating unit 150 at the time of completion of writing of each header element into the header storage buffer 145. In order to read a header 506 from one of the header storage buffers 145 a header read selector 146 is controlled in accordance with a header read control signal 802.

Figure 11:
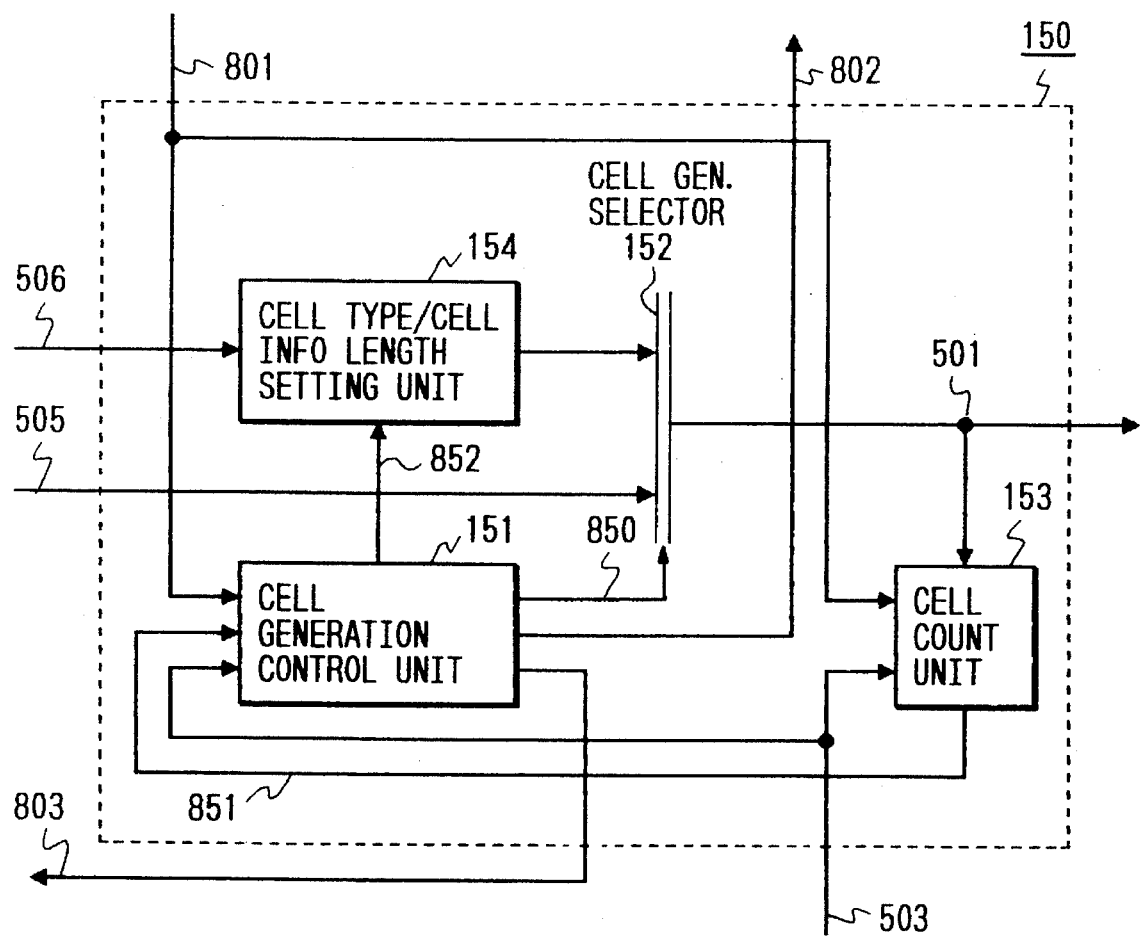
FIG. 11 illustrates the cell generating unit of the present invention.

The structure of the cell generating unit 150 will next be described in reference to FIG. 11. In FIG. 11 a cell generation control unit 151 delivers a frame information read control signal 803 to the output control unit 114 of the LAN corresponding unit 110 and a header read control signal 802 to the header read selector 146 of the header generating unit 140, based on the header generation completion signal 801 and a LAN frame transfer completion signal 851. Further, the cell generation control unit 151 controls a cell generation selector 152 by use of a cell generation control signal 850 so as to produce a cell 501 by successively outputting the header signal 506 and the LAN frame 505 read in the form of a 44 byte unit from the LAN frame buffer 113. At this time, the cell type and the cell information length in the header 506 are reset in a cell type/cell information length setting unit 154.

An algorithm of resetting the cell type and the cell information length will hereinafter be described. The cell type is reset as follows. Namely, a cell corresponding to the head of the LAN frame is reset to 1 indicative of "a head cell", a cell corresponding to the most rearward is reset to 2 indicative of "a most rearward cell" and a cell used to transfer a LAN frame with 1 cell is reset to 3 indicative of "a unitary cell". The cell information length is reset to 44 indicative of "a head cell" and "an intermediate cell". The control for the resetting of the cell type and the cell information length is performed by the cell generation control unit 151 by use of a resetting control signal 852. The cell generation control unit 151 serves to classify the types of "head cell", "intermediate cell" "most rearward cell" and "unitary cell" in accordance with the frame length signal 503 delivered from the LAN corresponding unit 110 and the LAN frame transfer completion signal 851 delivered from a cell counting unit 153. The cell generation control unit 151 thereby outputs the resetting control signal 852 to the cell type/cell information length setting unit 154 based on the types thus classified.

The cell counting unit 153 counts the number of cells produced from the selector 152 and compares the number of the thus-produced cells with the number of cells required for the transfer of the LAN frame. The cell counting unit 153 makes a judgment as to whether or not the transfer of the LAN frame is terminated based on the result of its comparison, and delivers the LAN frame transfer completion signal 851 to the cell generation control unit 151. The number of the cells required for the transfer of the LAN frame is calculated from the LAN frame length signal 503 delivered from the LAN corresponding unit 110.

Figure 12:
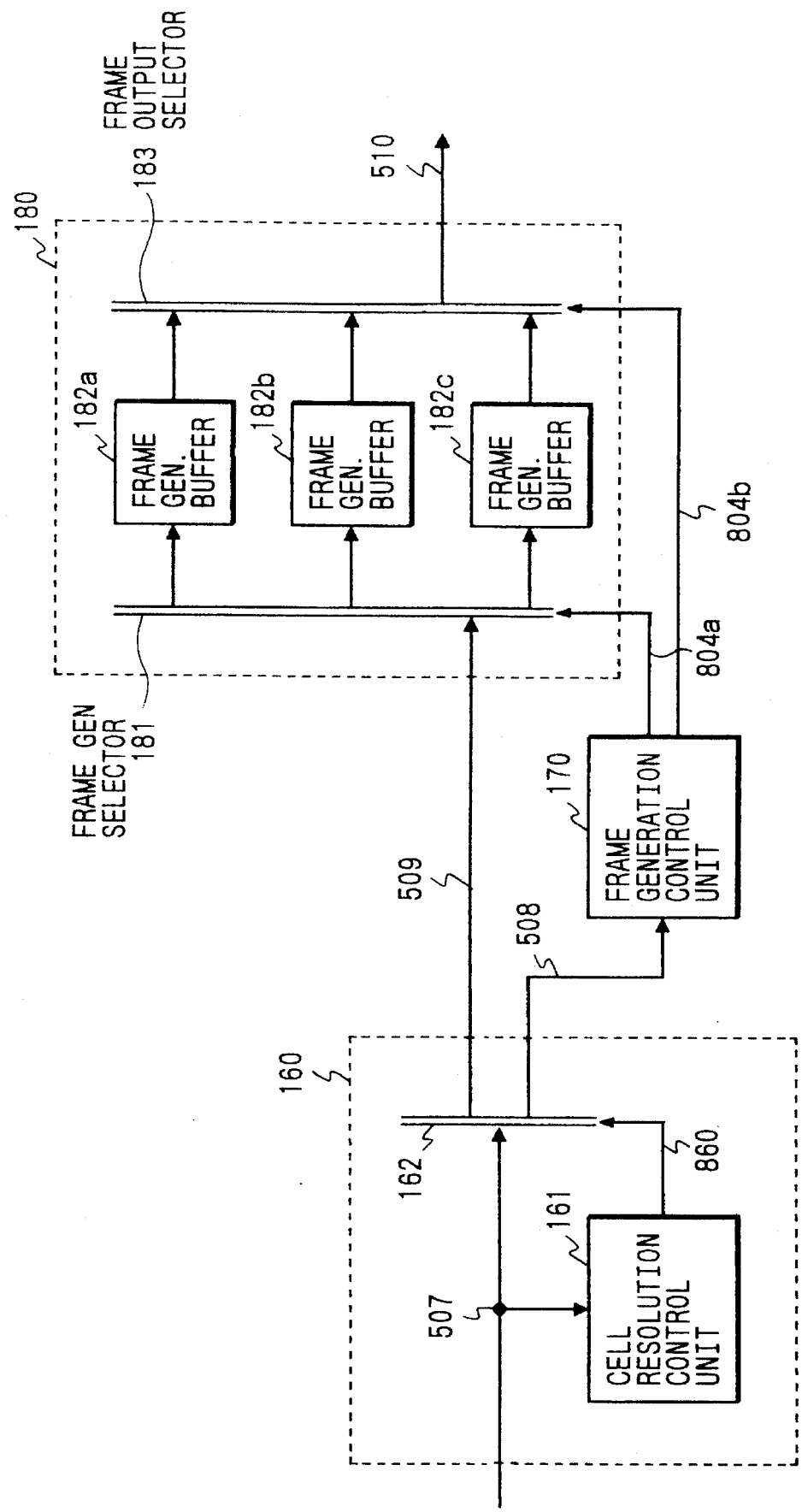
FIG. 12 illustrates the cell resolving unit and the frame generation control unit of the present invention.

FIG. 12 illustrates the structure of the cell decomposing or resolving unit 160, the frame generation control unit 170 and the frame generating unit 180 used to receive a cell and reset the received cell into a LAN frame. A cell resolution control unit 161 included in cell decomposing and resolving unit 160 controls a cell resolution selector 162 by use of a cell resolution control signal 860. The received cell 507 inputted to the cell resolving unit 160 is separated by the selector 162 into the header 508 and the user information 509 of the received cell, which are in turn is outputted to the frame generation control unit 170 and the frame generating unit 180, respectively. The frame generation control unit 170 is responsive to a VCI in the header 508 to control a frame generation selector 181 by use of a frame generation control signal 804a in such a manner that the user information of the received cell used for the same VCI as that referred to above is stored in the same frame generating buffer 182 of the plural generating buffers 182a–c. The frame generation control unit 170 serves to recognize the completion of the frame generation based on the cell type and the cell information length. When the generating process of the frame is terminated, the frame generation control unit 170 controls a frame output selector 183 by use of a frame output control signal 804b in such a manner that the LAN frame 510 outputted from the frame generating buffer 182 in which the frame has been stored, can be out-putted to the LAN 20. The number of buffers of the frame generating buffer 182 are shown as three in the present invention. However, the number of buffers is determined by the structure of the network system.

A description will now be provided of a broadcast algorithm with reference to FIGS. 13 through 17 by way of example.

Figure 13:
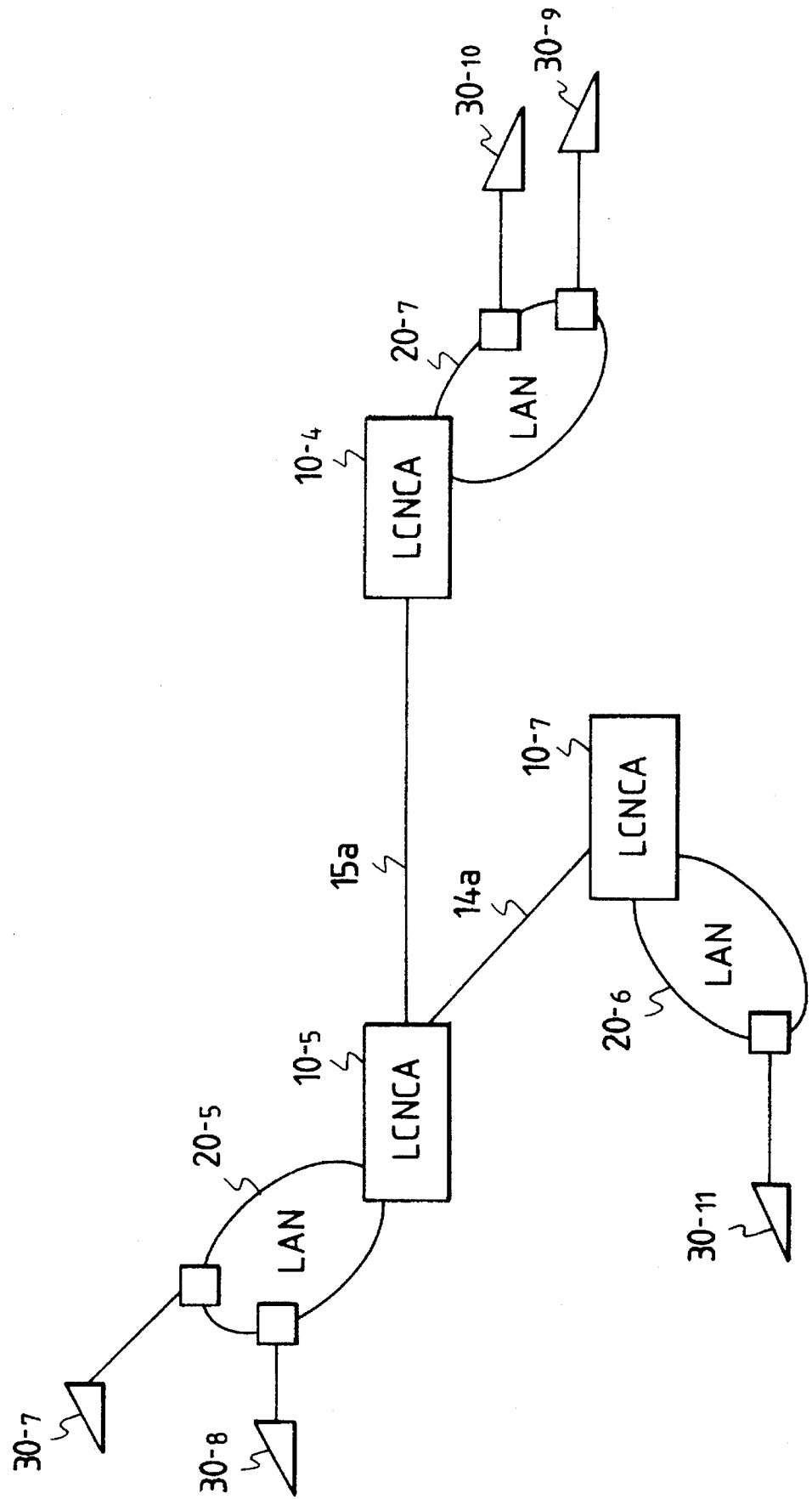
FIG. 13 illustrates a broadcast tree-type structure including the local area communication network connecting apparatus of the present invention.
Figure 14:
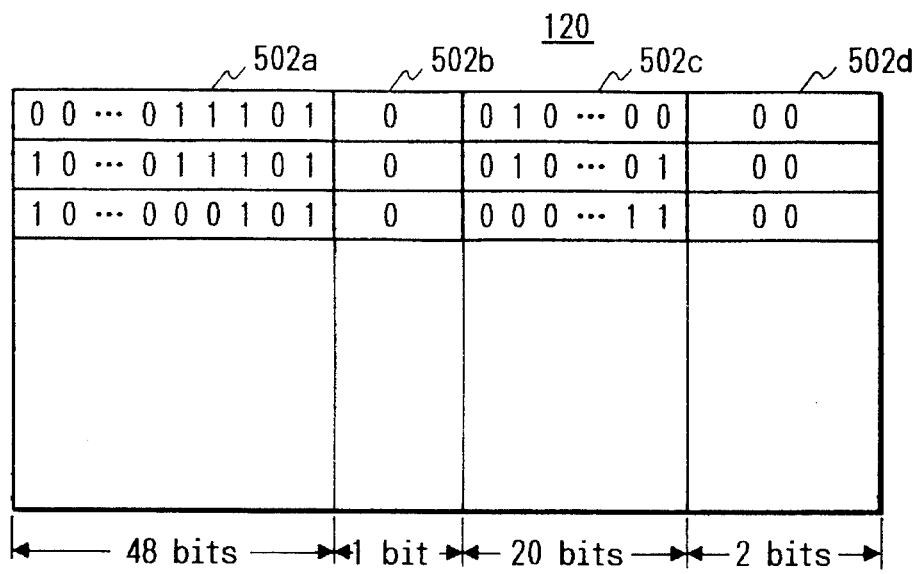
FIG. 14 illustrates the structure of a selection table for performing the broadcast tree type structure shown in FIG. 13.
Figure 15:
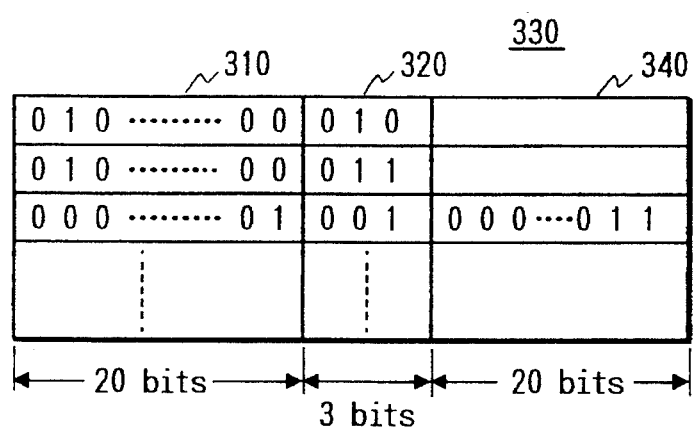
FIGS. 15–17 illustrate routing tables used in the broadcast tree-type structure shown in FIG. 13.
Figure 16:
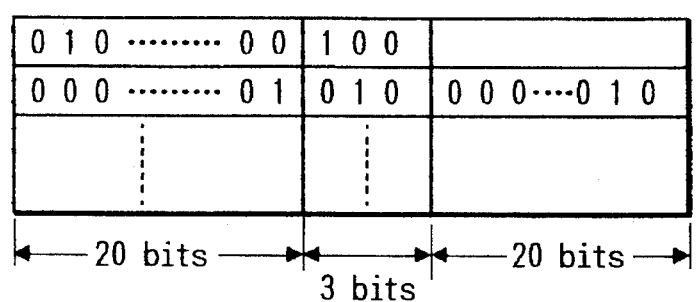
Figure 17:
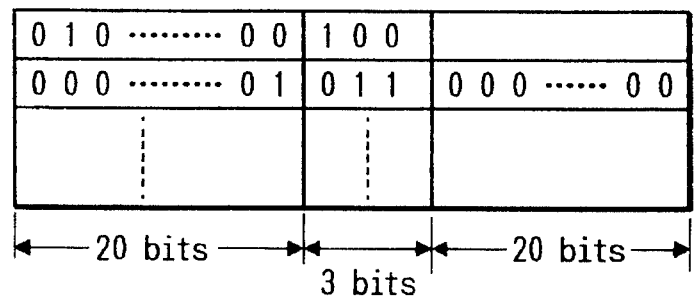

FIG. 13 is a diagram showing a broadcast tree-type structure at the time where a terminal 30-7 is a source of transmission in a case where the terminal 30-7 communicates simultaneously with a LAN 20-6 and a LAN 20-7. FIG. 14 is a diagram showing the selection table for the local-area communication network connecting apparatus 10. FIGS. 15 through 17 are routing tables for the local-area communication network connecting apparatus 10-5 to 10-7.

When a broadcast LAN frame is delivered from the terminal 30-7, the LAN connecting unit 100 of the local—area communication network connecting apparatus 10-5 sets up a cell from the LAN frame, and refers to the selection table 120 of FIG. 14 so as to set a VCI to (010 . . . 00). The VCI and the cell is transferred to the converting unit 300. The converting unit 300 refers to a routing table 330 as shown in FIG. 15 so as to output a desired cell to an output path (010) and an output path (011) each corresponding to the VCI (010 . . . 00). The output path (010) is electrically connected to a SONET converting unit 400b connected to dedicated digital line 15a, whereas the output path (011) is electrically connected to a SONET converting unit 400c connected to dedicated digital line 14a. The cell thus outputted is set up in the form of a SONET frame to be outputted to the digital dedicated lines 14a and 15a. The local-area communication network connecting apparatus 10-6 resolves the SONET frame into a cell at the SONET converting unit thereof, and refers to the routing table as shown in FIG. 16 at the converting unit 30 so as to output the cell to an output path (100) corresponding to the VCI (010 . . . 00). The output path (100) is electrically connected to a LAN connecting unit 100 coupled to the LAN 20-7, where the cell is set up to be a LAN frame so as to be outputted to the LAN 20-7. Since the terminal 30-7 applies a broadcast MAC address to the LAN frame, the thus-set up LAN frame is handled as a broadcast LAN frame in the LAN 20-7, and hence all the terminals connected to the LAN 20-7 accept the LAN frame.

Parallel to the above, the local-area communication network connecting apparatus 10-7 serves to resolve the SONET frame from SONET converting unit 400c into a cell at the SONET converting unit 400c included therein. The local area communication network connects apparatus 10-7 refers to the routing table shown in FIG. 17 at the converting unit 300 so as to output the cell to an output path (100) corresponding to the VCI (010 . . . 00). The output path (100) is electrically connected to the LAN connecting unit 100 coupled to the LAN 20-6, where the cell is set up to be a LAN frame so as to be outputted to the LAN 20-6. Since the terminal 30-7 gives the broadcast MAC address to the LAN frame, the LAN frame thus set up is treated as a broadcast LAN frame in the LAN 20-6, and hence all the terminals electrically connected to the LAN 20-6 accept the LAN frame.

Even when the DA of the LAN frame delivered from the terminal 30-7 is not registered in the selection table 120, a cell added with the VCI (010 . . . 00) is produced. The subsequent process is the same as where broadcast LAN frame is delivered out.

According to the present invention, the setting of the broadcast paths can be performed by making use of the VCI used for the broadcast cell assigned uniquely, as the VCI of the broadcast cell, by the LAN connecting unit at the source of transmission. In addition, the transfer of the broadcast cell can be accomplished by setting desired paths to the broadcast tree-type structure.

We claim:

1. A network broadcast communication system for interconnecting local area networks (LAN's) and private branch exchanges (PBX's), comprising:

at least one local area communication network connecting apparatus for interconnecting said LAN's and PBX's and permitting broadcast communication between said LAN's, each local area communication network connecting apparatus includes:

at least one LAN connecting unit, electrically connected to a LAN, for converting a LAN frame transmitted from said LAN to a cell including a virtual channel identifier (VCI) which identifies desired destinations of said cell converted by said at least one LAN connecting unit, at least one PBX connecting unit, electrically connected to a PBX, for converting an audio signal transmitted from said PBX to a cell including a VCI which identifies a desired destination of said cell converted by said at least one PBX connecting unit, and a converting unit, electrically connected to said at least one LAN connecting unit, said at least one PBX connecting unit and a plurality of output paths, for responding to said VCI included in a cell received from said at least one LAN connecting unit or a cell received from said at least one PBX connecting unit, wherein when said VCI is included in said cell received from said at least one LAN connecting unit and is a broadcast VCI, said converting unit adds at least two output path numbers which identify at least two output paths connected between said converting unit and desired destinations to said cell received from said at least one LAN connecting unit based on said VCI included in said cell from said at least one LAN connecting unit and outputs said cell received from said at least one LAN connecting unit to said at least two output paths identified by said output path numbers and when said VCI is included in said cell received from said at least one PBX connecting unit, said converting unit adds an output path number which identifies an output path between said converting unit and a desired destination to said cell received from said at least one PBX connecting unit based on said VCI included in said cell received from said at least one PBX connecting unit and outputs said cell received from said at least one PBX connecting to said output path identified by said output path number.

2. A network broadcast communication system according to claim 1 wherein said converting unit comprises:

means for establishing relationships between VCIs corresponding to VCIs included in a cell received from said at least one LAN connecting unit or a cell received from said at least one PBX connecting unit and output path numbers each identifying an output path and connected to said converting unit;

wherein said converting unit refers to said means for establishing relationships by applying a VCI of a cell to said means for establishing relationships to obtain said at least two output path numbers which identity said at least two output paths connected between said converting unit and said desired destinations when said VCI of said cell has been received, from said at least one LAN connecting unit and is a broadcast VCI or said output path number which identifies said output path connected between said converting unit and said desired destination when said VCI of said cell has been received from said at least one PBX connecting unit.

3. A network broadcast communication system according to claim 2, wherein said means for establishing relationships is a selection table having a plurality of entries, each entry including a terminal address, an attribute, a VCI, a priority level and a LAN number.

4. A network broadcast communication system according to claim 1 wherein said LAN connecting unit comprises:

cell resolving means for resolving a cell received from another LAN into a received header signal and a received user information signal;

frame generation control means for outputting a frame control signal in response to said received header signal from said cell resolving means; and frame generating means for generating a LAN frame for transmission to said LAN based on said received user information signal from said cell resolving means and said frame control signal from said frame generation control means.

5. A network broadcast communication system: for interconnecting local area networks (LAN's) and private branch exchanges (PBX's), comprising:

at least one local area communication network connecting apparatus for interconnecting said LAN's and PBX's, each local area communication network connecting apparatus includes:

at least one LAN connecting unit, electrically connected to a LAN, for converting a LAN frame transmitted from said LAN to a cell including a virtual channel identifier (VCI) which identifies a desired destination of said cell converted by said at least one LAN connecting unit, at least one PBX connecting unit, electrically connected to a PBX, for converting an audio signal transmitted from said PBX to a cell including a VCI which identifies a desired destination of said cell converted by said at least one PBX connecting unit, and a converting unit, electrically connected to said at least one LAN connecting unit, said at least one PBX connecting unit and a plurality of output paths, for responding to a VCI included in a cell received from said at least one LAN connecting unit or a cell received from said at least one PBX connecting unit, adding at least an output path number which identifies at least one output path connected between said converting unit and a desired destination to said cell received from said at least one LAN connecting unit or said cell received from said at least one PBX connecting unit based on said VCI included in said cell received from said at least one LAN connecting unit or said cell received from said at least one PBX connecting unit and outputting said cell received from said at least one LAN connecting unit or said cell received from said at least one PBX connecting unit to said at least one output path identified by said output path number;

wherein said at least one LAN connecting unit comprises:

a LAN corresponding unit for receiving a LAN frame transmitted from said LAN and in response thereto outputting a destination address signal, a LAN number signal, a frame length signal and said LAN frame based on a frame read control signal and a frame reject signal, selection control means for determining whether said LAN frame is a local-in destination frame identifying a terminal in said LAN or a local-out destination frame identifying another LAN based on said destination address signal, said LAN number signal and predetermined selection process information from a selection register, rejecting said LAN frame when said LAN frame is a local-in destination frame by outputting said frame reject signal to said LAN corresponding unit to reject said LAN frame and outputting an exchange control signal when said LAN frame is a local-out destination frame, header generating means for generating a header signal and a header generation completion signal which indicates completion of header generation based on said frame length signal output by said LAN corresponding unit, said exchange control signal output by said selection control means and a header read control signal, and cell generating means for generating said cell converted by said at least one LAN connecting unit, a header read control signal for reading a header signal from said header generating means and a frame read control signal for reading said LAN frame from said LAN corresponding unit based on said header signal and said header generation completion signal output by said header generating means and said LAN frame and said frame length signal output by said LAN corresponding unit.

6. A network broadcast communication system according to claim 5 wherein said LAN connecting unit further comprises:

cell resolving means for resolving a cell received from another LAN into a received header signal and a received user information signal;

frame generation control means for outputting a frame control signal in response to said received header signal from said cell resolving means; and frame generating means for generating a LAN frame for transmission to said LAN based on said received user information signal from said cell resolving means and said frame control signal from said frame generation control means.

7. A network broadcast communication system according to claim 5 wherein said LAN corresponding unit comprises:

LAN frame supervising means for receiving said frame reject signal and said LAN frame and outputting in response thereto an input selector control signal, a frame input completion control signal and a frame length signal;

input selector means for receiving said LAN frame and selectively outputting said LAN frame to a plurality of LAN frame buffers based on said input selector control signal from said LAN frame supervising means;

output control means for receiving said frame input completion signal from said LAN frame supervising means, a frame read control signal from said cell generating means and outputting in response thereto a data read selector control signal, an output selector signal, a data read control signal and a LAN number signal;

data read selector means for selecting one of said plurality of LAN frame buffers based on said data read selector control signal from said output control means;

data read means for reading a LAN frame stored in said selected LAN frame buffer based on said data read control signal from said output control means; and output selector means for selecting from said LAN frame read by said data read means, a destination address signal and said LAN frame read by said data read means, outputting said destination address signal to said selection control means and outputting said LAN frame read by said data read means to said cell generating means.

8. A network broadcast communication system according to claim 5 wherein said cell generating means comprises:

cell generation control means for outputting a cell generation control signal, a resetting control signal, said header read control signal and said frame read control signal in response to said frame length signal from said LAN corresponding unit said header generation completion signal from said header generation unit and a frame transfer completion signal;

cell type/cell information length setting unit for setting a cell type and a cell information length in response to said cell resetting control signal from said cell generation control means and said header signal from said header generating unit and outputting a reset cell;

cell generation selector means for selecting said reset cell from said cell type/information length setting means or said LAN frame from said LAN corresponding unit in response to said cell generation control signal from said cell generation control means; and cell counting means for outputting a LAN frame transfer completion signal to said cell generation control means in response to said frame length signal from said LAN corresponding unit and said header generation completion signal from said header generating means.

9. A network broadcast communication system for interconnecting local area networks (LAN's) and private branch exchanges (PBX's), comprising:

at least one local area communication network connecting apparatus for interconnecting said LAN's and PBX's, each local area communication network connecting apparatus includes:

at least one LAN connecting unit, electrically connected to a LAN, for converting a LAN frame transmitted from said LAN to a cell including a virtual channel identifier (VCI) which identifies a desired destination of said cell converted by said at least one LAN connecting unit, at least one PBX connecting unit, electrically connected to a PBX, for converting an audio signal transmitted from said PBX to a cell including a VCI which identifies a desired destination of said cell converted by said at least one PBX connecting unit, and a converting unit, electrically connected to said at least one LAN connecting unit, said at least one PBX connecting unit and a plurality of output paths, for responding to a VCI included in a cell received from said at least one LAN connecting unit or a cell received from said at least one PBX connecting unit, adding at least an output path number which identifies at least one output path connected between said converting unit and a desired destination to said cell received from said at least one LAN connecting unit or said cell received from said at least one PBX connecting unit based on said VCI and outputting said cell received from said at least one LAN connecting unit or said cell received from said at least one PBX connecting unit to said at least one output path identified by said output path number;

wherein said converting unit comprises:

means for establishing relationships between VCIs corresponding to VCIs included in said cell received from said at least one LAN connecting unit or said cell received from said at least one PBX connecting unit and output path numbers each identifying at least one output path and connected to said converting unit, wherein said converting unit refers to said means for establishing relationships by applying said VCI of said cell received from said at least one LAN connecting unit or said cell received from said at least one PBX connecting unit to said means for establishing relationships to obtain said output path number which identifies said at least one output path connected between said converting unit and said desired destination;

wherein said means for establishing relationships is a selection table having a plurality of entries, each entry including a terminal address, an attribute, a VCI, a priority level and a LAN number;

wherein said selection table is included within selection control means which further comprises:

terminal address read means for reading a terminal address and a LAN number from said selection table and outputting a combination of said terminal address and said LAN number in response to a terminal address read control signal, comparator means for comparing said combination of said terminal address and said LAN number form said terminal address read means and a destination address and a LAN number from a LAN corresponding unit included in said at least one LAN connecting unit to determine whether said combination of said terminal address and said LAN number from said selection table and said destination address and said LAN number from said LAN corresponding unit are related to each other and outputting a result signal indicating whether said combination of said terminal address and said LAN number from said selection table and said destination address and said LAN number from said LAN corresponding means are related to each other, determining means for transmitting another terminal address read control signal to said terminal address read means if said combination of said terminal address and said LAN number from said selection table and said destination address and said LAN number from said LAN corresponding unit are not related to each other thereby causing said terminal address read means to read the next terminal address and LAN number from said selection table until a match occurs, outputting an attribute read signal when said combination of said terminal address and said LAN number from said selection table and said destination address and said LAN number from said LAN corresponding unit are related to each other and outputting a destination address unregistered signal when no match is found between all terminal addresses and LAN numbers registered in said selection table and said destination address and said LAN number from said LAN corresponding unit, attribute read means for reading a attribute from said selection table based on said attribute read control signal from said determining means and in response thereto outputting a frame reject control signal to said LAN corresponding unit if said attribute from said selection table indicates that said LAN frame is a local-in destination frame, and outputting a VCI/ priority level read control signal if said attribute from said selection table indicates that said LAN frame is a local-out destination frame, VCI read means for reading a VCI from said selection table in response to said VCI/priority level read control signal from said attribute read means, reading a predetermined VCI from a broadcast cell register when said destination address unregistered signal is received from said determining means and outputting said read VCI as a part of said exchange control signal, and priority level read means for reading a priority level from said selection table based on said VCI/priority level read control signal from said attribute read means, reading a predetermined priority level from a priority level register when said destination address unregistered signal is received from said determining means and outputting said read priority level as a part of said exchange control signal.

10. A network broadcast communication system according to claim 9 wherein said header generating unit comprises:

header generation control means for generating conversion control information for use by said converting means, error control code information for use in error checking said conversion control information, said VCI from said selection control means information, said priority level from said selection control means and said header signal in said converting means, cell type information which indicates which section of said LAN frame is being held in a cell and cell length information which indicates an effective information region of a cell, and for generating a header generation control signal, a header storage control signal and said header generation completion in response to said VCI and said priority level from said selection control means and said frame length signal from said LAN corresponding unit;

conversion register for storing said conversion control information;

VCI register for storing said VCI;

priority level register for storing said priority level;

error code register for storing said error code information;

cell type register for storing said cell type information;

cell length register for storing said cell length information;

header generation selector for selectively outputting one of said registers in response to said header generation control signal from said header generation control unit;

header storage selector for selectively applying said selected output to a plurality of header buffers in response to said header storage control signal from said header generation control means; and header read selector means for selectively outputting one of said plurality of header buffers as said header signal to said cell generating means in response to said header read control signal output by said cell generating means.

11. A network broadcast communication system for interconnecting local area networks (LAN's) and private branch exchanges (PBX's), comprising:

at least one local area communication network connecting apparatus for interconnecting said LAN's and PBX's, each local area communication network connecting apparatus includes:

at least one LAN connecting unit, electrically connected to a LAN, for converting a LAN frame transmitted from said LAN to a cell including a virtual channel identifier (VCI) which identifies a desired destination of said cell converted by said at least one LAN connecting unit, at least one PBX connecting unit, electrically connected to a PBX, for converting an audio signal transmitted from said PBX to a cell including a VCI which identifies a desired destination of said cell converted by said at least one PBX connecting unit, and a converting unit, electrically connected to said at least one LAN connecting unit, said at least one PBX connecting unit and a plurality of output paths, for responding to a VCI included in a cell from said at least one LAN connecting unit or a cell received from said at least one PBX connecting unit, adding at least an output path number which identifies at least one output path connected between said converting unit and a desired destination to said cell received from said at least one LAN connecting unit or said cell received from said at least one PBX connecting unit based on said VCI included in said cell received from said at least one LAN connecting unit or said cell received from said at least one PBX connecting unit and outputting said cell received from said at least one LAN connecting unit or said cell received from said at least one PBX connecting unit to said at least one output path identified by said output path number;

wherein said at least one LAN connecting unit comprises:

cell resolving means for resolving a cell received from another LAN into a received header signal and a received user information signal, frame generation control means for outputting a frame control signal in response to said received header signal from said cell resolving means, and frame generating means for generating a LAN frame for transmission to said LAN based on said received user information signal from said cell resolving means and said frame control signal from said frame generation control means;

wherein said cell resolving unit comprises:

cell resolution control means for outputting a cell resolution control signal in response to a received broadcast cell, and cell resolution selector means for selecting a header signal and a user information signal from said received cell based on said cell resolution control signal.

12. The network broadcast communication system according to claim 11, wherein said frame generating means comprises:

frame generation selector means for selectively storing said user information signal in a plurality of frame generation buffers based on a frame generation control signal from said frame generation control means; and frame output selector means for selectively outputting a signal from one of said plurality of frame generation buffers as a LAN frame based on a frame output control signal from said frame generation control unit.

13. A local area communication network connecting apparatus for interconnecting local area networks (LAN's) and private branch exchanges (PBX's), comprising:

at least one local area communication network connecting apparatus for interconnecting said LAN's and PBX's and permitting broadcast communication between said LAN's, each local area communication network connecting apparatus includes:

at least one LAN connecting unit, electrically connected to a LAN, for converting a LAN frame transmitted from said LAN to a cell including a virtual channel identifier (VCI) which identifies a desired destination of said cell converted by said at least one LAN connecting unit, at least one PBX connecting unit, electrically connected to a PBX, for converting an audio signal transmitted from said PBX to a cell including a VCI which identifies a desired destination of said cell converted by said at least one PBX connecting unit, and a converting unit, electrically connected to said at least one LAN connecting unit, said at least one PBX connecting unit and a plurality of output paths, for responding to a VCI included in a cell from said at least one LAN connecting unit or a cell received from said at least one PBX connecting unit, wherein when said VCI is included in said cell received from said at least one LAN connecting unit and is a broadcast VCI, said converting unit adds at least two output path numbers which identify at least two output paths connected between said converting unit and desired destinations to said cell received from said at least one LAN connecting unit based on said VCI included in said cell from said at least one LAN connecting unit and outputs said cell received from said at least one LAN connecting unit to said at least two output paths identified by said output path numbers and when said VCI is included in said cell received from said at least one PBX connecting unit said converting unit adds an output path number which identifies an output path between said converting unit and a desired destination to said cell received from said at least one PBX connecting based on said VCI included in said cell received from said at least one PBX connecting unit and outputs said cell received from said PBX connecting to said output path identified by said output path number.

14. A local area communication network connecting apparatus according to claim 13 wherein said converting unit comprises:

means for establishing relationships between VCIs corresponding to VCIs included in said cell received from said at least one LAN connecting unit or said cell received from said at least one PBX connecting unit and output path numbers each identifying an output path and connected to said converting unit;

wherein said converting unit refers to said means for establishing relationships by applying a VCI of a received cell to said means for establishing relationships to obtain said at least two output path numbers which identify said at least two output paths connected between said converting unit and said desired destinations when said VCI of said received cell is from said at least one LAN connecting unit and is a broadcast VCI or said output path number which identifies said output path connected between said converting unit and said desired destination when said VCI of said received cell is from said at least one PBX connecting unit.

15. A local area communication network connecting apparatus according to claim 14, wherein said means for establishing relationships is a selection table having a plurality of entries, each entry including a terminal address, an attribute, a VCI, a priority level and a LAN number.

16. A local area communication network connecting apparatus according to claim 15 wherein said selection table is included within selection control means which further comprises:

terminal address read means for reading a terminal address and a LAN number from said selection table and outputting a combination of said terminal address and said LAN number in response to a terminal address read control signal;

comparator means for comparing said combination of said terminal address and said LAN number from said terminal address read means and a destination address and a LAN number from a LAN corresponding unit included in said at least one LAN connecting unit to determine whether said combination of said terminal address and said LAN number from said selection table and said destination address and said LAN number from said LAN corresponding unit are related to each other and outputting a result signal indicating whether said combination of said terminal address and said LAN number from said selection table and said destination address and said LAN numbers from said LAN corresponding unit are related to each other;

determining means for transmitting another terminal address read control signal to said terminal address read means if said combination of said terminal address and said LAN number from said selection table and said destination address and said LAN number from said LAN corresponding unit are not related to each other thereby causing said terminal address read means to read the next terminal address and LAN number from said selection table until a match occurs, outputting an attribute read signal when said combination of said terminal address and said LAN number from said selection table and said destination address and said LAN number from said LAN corresponding means are related to each other and outputting a destination address unregistered signal when no match is found between all terminal addresses and LAN numbers registered in said selection table and said destination address and said LAN number from said LAN corresponding unit;

attribute read means for reading a attribute from said selection table based on said attribute read control signal from said determining means and in response thereto outputting a frame reject control signal to said LAN corresponding unit if said attribute from said selection table indicates that said LAN frame is a local-in destination frame, and outputting a VCI/priority level read control signal if said attribute from said selection table indicates that said LAN frame is a local-out destination frame;

VCI read means for reading a VCI from said selection table in response to said VCI/priority level read control signal from said attribute read means, reading a predetermined VCI from a broadcast cell register when said destination address unregistered signal is received from said determining means and outputting said read VCI as a part of said exchange control signal; and priority level read means for reading a priority level from said selection table based on said VCI/priority level read control signal from said attribute read means, reading a predetermined priority level from a priority level register when said destination address in registered signal is received from said determining means and outputting said read priority level as a part of said exchange control signal.

17. A local area communication network connecting apparatus according to claim 16 wherein said header generating unit comprises:

header generation control means for generating conversion control information for use by said converting means, error control code information for use in error checking said conversion control information, said VCI from said selection control means, said priority level from said selection control means and said header signal in said converting means, cell type information which indicates which section of said LAN frame is being held in a cell and cell length information which indicates an effective information region of a cell, and for generating a header generation control signal, a header storage control signal and said header generation completion in response to said VCI and said priority level from said selection control means and said frame length signal from said LAN corresponding unit;

conversion register for storing said conversion control information;

VCI register for storing said VCI;

priority level register for storing said priority level;

error code register for storing said error code information;

cell type register for storing said cell type information;

cell length register for storing said cell length information;

header generation selector for selectively outputting one of said registers in response to said header generation control signal from said header generation control unit;

header storage selector for selectively applying said selected output to a plurality of header buffers in response to said header storage control signal from said header generation control means; and header read selector means for selectively outputting one of said plurality of header buffers as said header signal to said cell generating means in response to said header read control signal output by said cell generating means.

18. A local area communication network connecting apparatus for interconnecting local area networks (LAN's) and private branch exchanges (PBX's), comprising:

at least one local area communication network connecting apparatus for interconnecting said LAN's and PBX's, each local area communication network connecting apparatus includes:
at least one LAN connecting unit, electrically connected to a LAN, for converting a LAN frame transmitted from said LAN to a cell including a virtual channel identifier (VCI) which identifies a desired destination of said cell converted by said at least one LAN connecting unit,
at least one PBX connecting unit, electrically connected to a PBX, for converting an audio signal transmitted from said PBX to a cell including a VCI which identifies a desired destination of said cell converted by said at least one PBX connecting unit, and
a converting unit, electrically connected to said at least one LAN connecting unit, said at least one PBX connecting unit and a plurality of output paths, for responding to a VCI included in a cell from said at least one LAN connecting unit or a cell received from said at least one PBX connecting unit, adding at least one output path number which identifies at least one output path connected between said converting unit and a desired destination to said cell received from said at least one LAN connecting unit or said cell received from said at least one PBX connecting unit based on said VCI included in said cell received from said at least one LAN connecting unit or said cell received from said at least one PBX connecting unit and outputting said cell received from said at least one LAN connecting unit or said cell received from said at least one PBX connecting unit to said at least one output path identified by said output path number;

wherein said at least one LAN connecting unit comprises:
a LAN corresponding unit for receiving a LAN frame transmitted from said LAN and in response thereto outputting a destination address signal, a LAN number signal, a frame length signal and said LAN frame based on a frame read control signal and a frame reject signal,
selection control means for determining whether said LAN frame is a local-in destination frame identifying a terminal in said LAN or a local-out destination frame identifying another LAN based on said destination address signal, said LAN number signal and predetermined selection process information from a selection register, rejecting said LAN frame when said LAN frame is a local-in destination frame by outputting said frame reject signal to said LAN corresponding unit to reject said LAN frame and outputting an exchange control signal when said LAN frame is a local-out destination frame,
header generating means for generating a header signal and a header generation completion signal which indicates completion of header generation based on said frame length signal output by said LAN corresponding unit, said exchange control signal output by said selection control means and a header read control signal, and
cell generating means for generating a cell, a header read control signal for reading a header signal from said header generating means and a frame read control signal for reading said LAN frame from said LAN corresponding unit based on said header signal and said header generation completion signal output by said header generating means and said LAN frame and said frame length signal output by said LAN corresponding unit.

19. A local area communication network connecting apparatus according to claim 18 wherein said at least one LAN connecting unit further comprises:

cell resolving means for resolving a cell received from another LAN into a received header signal and a received user information signal;

frame generation control means for outputting a frame control signal in response to said received header signal from said cell resolving means; and frame generating means for generating a LAN frame for transmission to said LAN based on said received user information signal from said cell resolving means and said frame control signal from said frame generation control means.

20. A local area communication network connecting apparatus according to claim 18 wherein said LAN corresponding unit comprises:

LAN frame supervising means for receiving said frame reject signal and said LAN frame and outputting in response thereto an input selector control signal, a frame input completion control signal and a frame length signal;

input selector means for receiving said LAN frame and selectively outputting said LAN frame to a plurality of LAN frame buffers based on said input selector control signal from said LAN frame supervising means;

output control means for receiving said frame input completion signal from said LAN frame supervising means, a frame read control signal from said cell generating means and outputting in response thereto a data read selector control signal, an output selector signal, a data read control signal and a LAN number signal;

data read selector means for selecting one of said plurality of LAN frame buffers based on said data read selector control signal from said output control means;

data read means for reading a LAN frame stored in said selected LAN frame buffer based on said data read control signal from said output control means; and output selector means for selecting from said LAN frame read by said data read means, a destination address signal and said LAN frame read by said data read means outputting said destination address signal to said selection control means and outputting said LAN frame read by said data read means to said cell generating means.

21. A local area communication network connecting apparatus according to claim 18 wherein said cell generating means comprises:

cell generation control means for outputting a cell generation control signal, a resetting control signal, said header read control signal and said frame read control signal in response to said frame length signal from said LAN corresponding unit, said header generation completion signal from said header generation unit and a frame transfer completion signal;

cell type/cell information length setting unit for setting a cell type and a cell information length in response to said cell resetting control signal from said cell generation control means and said header signal from said header generating means and outputting a reset cell;

cell generation selector means for selecting said reset cell from said cell type/information length setting means or said LAN frame from said LAN corresponding unit in response to said cell generation control signal from said cell generation control means; and cell counting means for outputting said LAN frame transfer completion signal to said cell generation control means in response to said frame length signal from said LAN corresponding unit, and said header generation completion signal from said header generating means.

22. A local area communication network connecting apparatus for interconnecting local area networks (LAN's) and private branch exchanges (PBX's), comprising:

at least one local area communication network connecting apparatus for interconnecting said LAN's and PBX's each local area communication network connecting apparatus includes:

at least one LAN connecting unit, electrically connected to a LAN, for converting a LAN frame transmitted from said LAN to a cell including a virtual channel identifier (VCI) which identifies a desired destination of said cell converted by said at least one LAN connecting unit, at least one PBX connecting unit, electrically connected to a PBX, for converting an audio signal transmitted from said PBX to a cell including a VCI which identifies a desired destination of said cell converted by said at least one PBX connecting unit, and a converting unit, electrically connected to said at least one LAN connecting unit, said at least one PBX connecting unit and a plurality of output paths, for responding to a VCI included in a cell received from said at least one LAN connecting unit or a cell received from said at least one PBX connecting unit, adding at least one output path number which identifies at least one output path connected between said converting unit and a desired destination to said cell received from said at least one LAN connecting unit or said cell received from said at least one PBX connecting unit based on said VCI included in said cell received from said at least one LAN connecting unit or said cell received from said at least one PBX connecting unit and outputting said cell received from said at least one LAN connecting unit or said cell received from said at least one PBX connecting unit to said at least one output path identified by said output path number;

wherein said at least one LAN connecting unit comprises:

cell resolving means for resolving a cell received from another LAN into a received header signal and a received user information signal, frame generation control means for outputting a frame control signal in response to said received header signal from said cell resolving means, and frame generating means for generating a LAN frame for transmission to said LAN based on said received user information signal from said cell resolving means and said frame control signal from said frame generation control means.

23. A local area communication network connection apparatus according to claim 22 wherein said cell resolving unit comprises:

cell resolution control means for outputting a cell resolution control signal in response to a received broadcast cell; and cell resolution selector means for selecting a header signal and a user information signal from said received cell based on said cell resolution control signal.

24. The local area communication network connecting apparatus according to claim 22, wherein said frame generating means comprises:

frame generation selector means for selectively storing said user information signal a plurality of frame generation buffers based on a frame generation control signal from said frame generation control means; and frame output selector means for selectively outputting a signal from one of said plurality of frame generation as a LAN frame based on a frame output control signal from said frame generation control unit.

\* \* \* \* \*